United States Patent [19]
Scheeres

[11] Patent Number: 5,240,656
[45] Date of Patent: Aug. 31, 1993

[54] TREATMENT OF WASTE

[75] Inventor: David J. Scheeres, Sully, United Kingdom

[73] Assignee: Plastics Densification, Inc., Dover, Del.

[21] Appl. No.: 703,537

[22] Filed: May 21, 1991

[51] Int. Cl.$^5$ .................................. B29B 17/00
[52] U.S. Cl. ........................ 264/37; 219/421;
264/143; 264/162; 264/323; 264/327; 264/334;
264/348; 264/DIG. 46; 264/DIG. 69; 425/144;
425/174.8 R; 425/384; 425/441; 425/812;
425/DIG. 55; 425/308
[58] Field of Search ......... 264/102, 37, 321, DIG. 69,
264/DIG. 46, 327, 323, 162, 348, 143, 334;
425/174.4, 174.8 R, 174, 202, 203, 308, 384,
438, DIG. 55, 441, 812; 219/421

[56] References Cited

U.S. PATENT DOCUMENTS

| | | | |
|---|---|---|---|
| 4,030,867 | 6/1977 | Everman | 425/144 |
| 4,091,967 | 5/1978 | Kinoshita | 425/202 |
| 4,254,068 | 3/1981 | Otsuka | 264/321 |
| 4,308,447 | 12/1981 | Notzold et al. | 425/144 |
| 4,413,969 | 11/1983 | McDonald | 264/DIG. 69 |
| 4,504,436 | 3/1985 | Louvier | 264/321 |
| 4,665,101 | 5/1987 | Ficker | 425/174.4 |

FOREIGN PATENT DOCUMENTS

| | | |
|---|---|---|
| 0140846 | 5/1985 | European Pat. Off. . |
| 0144495 | 6/1985 | European Pat. Off. . |
| 2204733 | 8/1973 | Fed. Rep. of Germany . |
| 8525903.9 | 1/1986 | Fed. Rep. of Germany . |
| 3717609 | 12/1988 | Fed. Rep. of Germany ........ 264/37 |
| 53-77284 | 7/1978 | Japan ................................. 264/321 |
| 55-87523 | 7/1980 | Japan ................................. 264/37 |
| 56-30822 | 3/1981 | Japan ................................. 264/37 |
| 59-1233A | 6/1984 | Japan . |
| 60-145809 | 8/1985 | Japan . |
| 61-116507 | 6/1986 | Japan ................................. 264/37 |
| 61-273913A | 12/1986 | Japan . |
| 63-242505 | 10/1988 | Japan ................................. 264/37 |
| 1-176486A | 7/1989 | Japan . |
| 1572623 | 4/1977 | United Kingdom . |

*Primary Examiner*—Jeffery Thurlow
*Attorney, Agent, or Firm*—Panitch, Schwarze, Jacobs & Nadel

[57] ABSTRACT

A method and an apparatus for treating contaminated plastics waste, comprising densifying contaminated plastics waste by causing the waste to pass through a heating zone to produce molten contaminated plastics, and causing the molten contaminated plastics to flow continuously out of the heating zone under the influence of gravity.

56 Claims, 15 Drawing Sheets

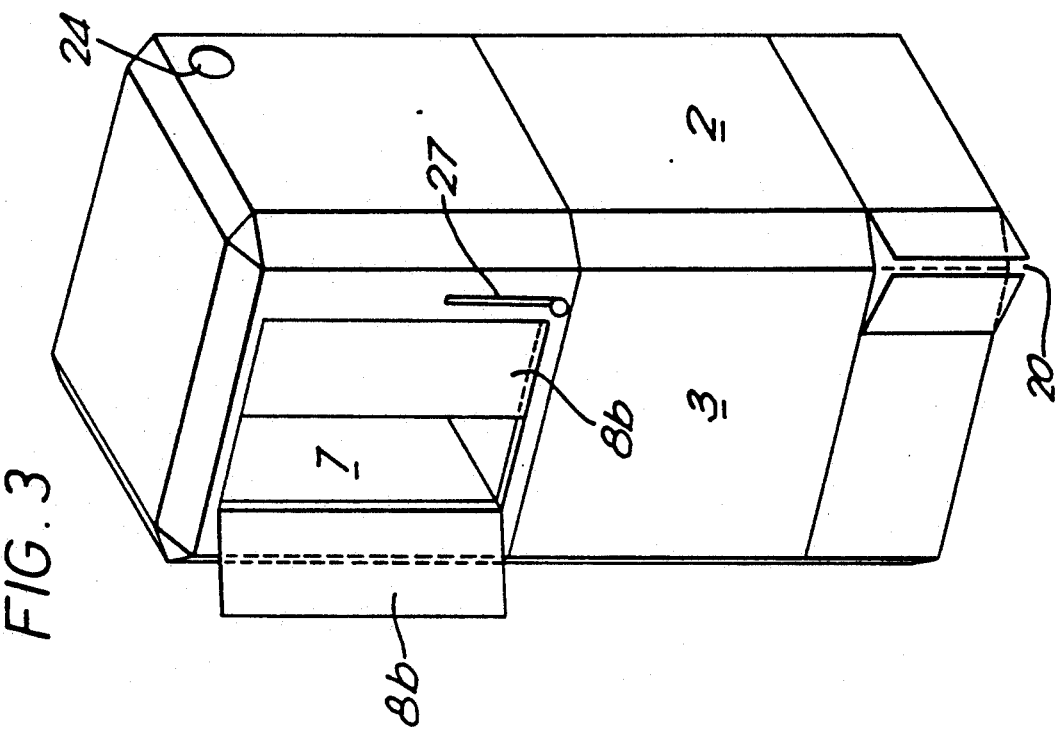
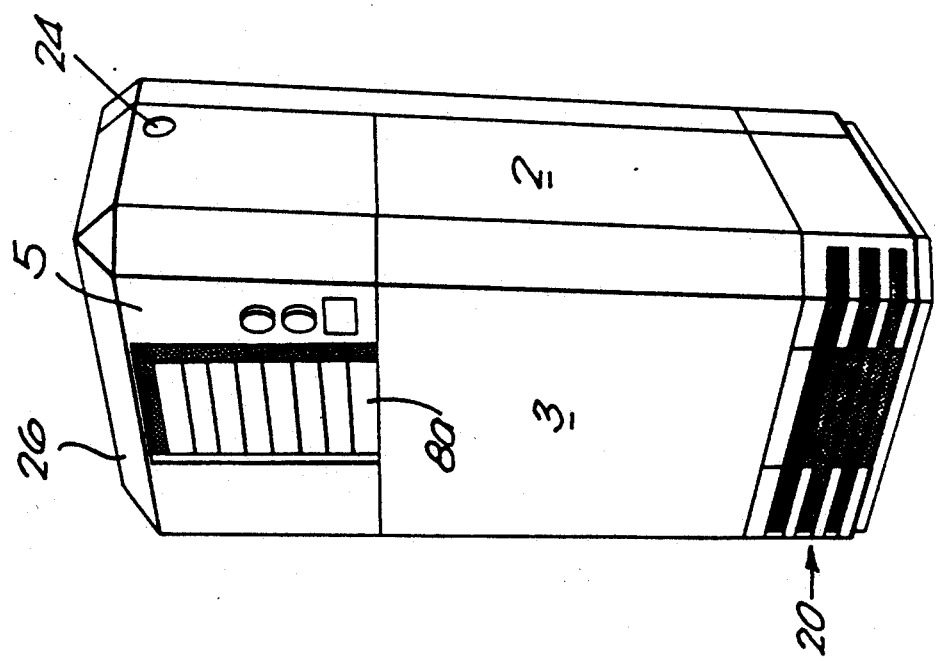

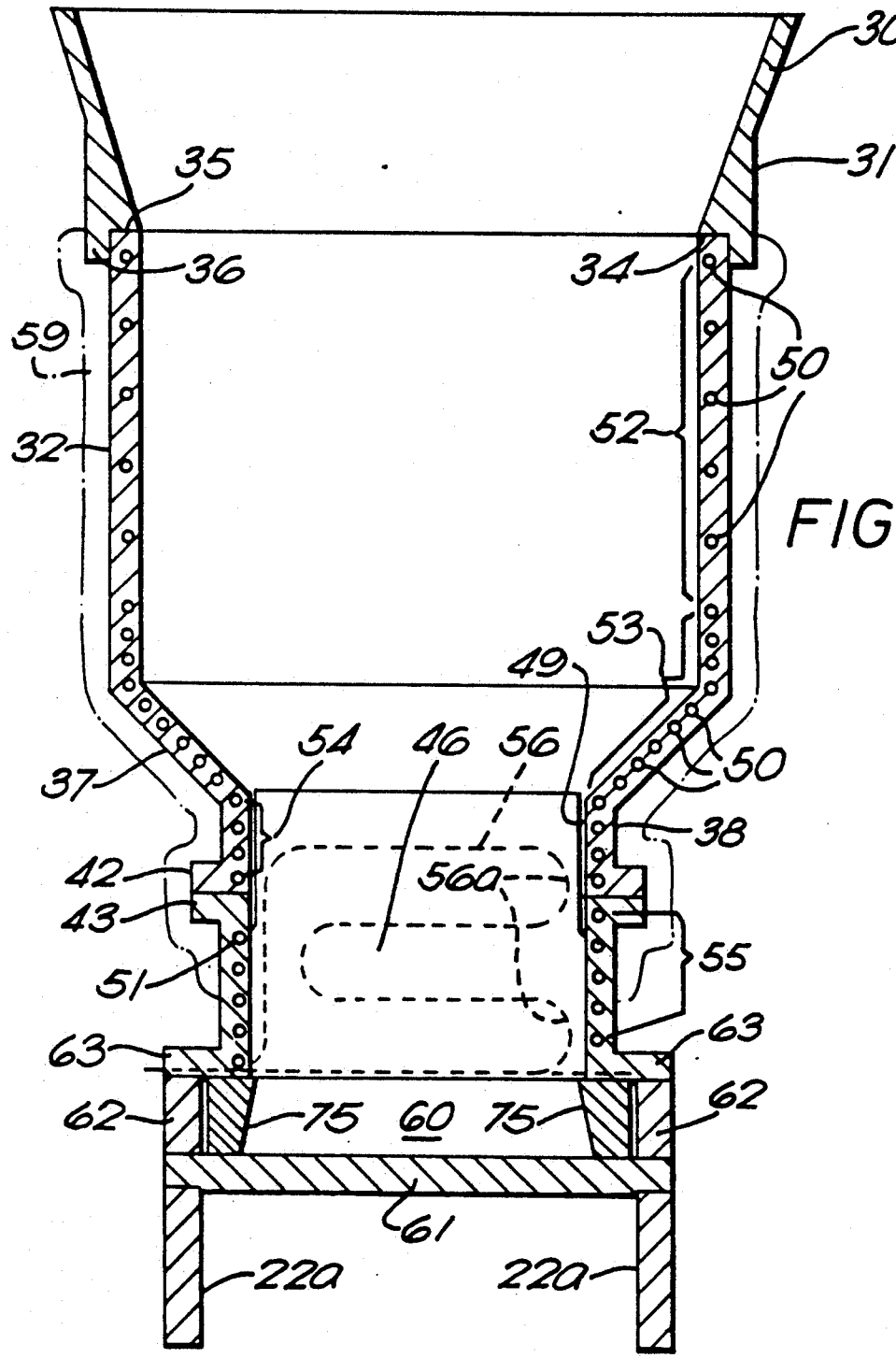
FIG. 6
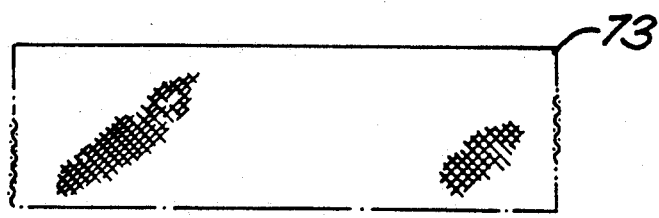

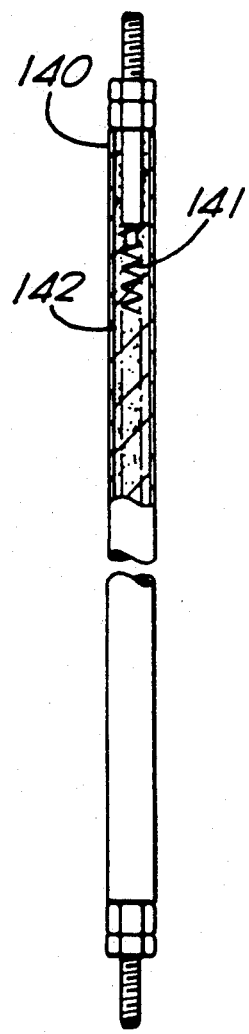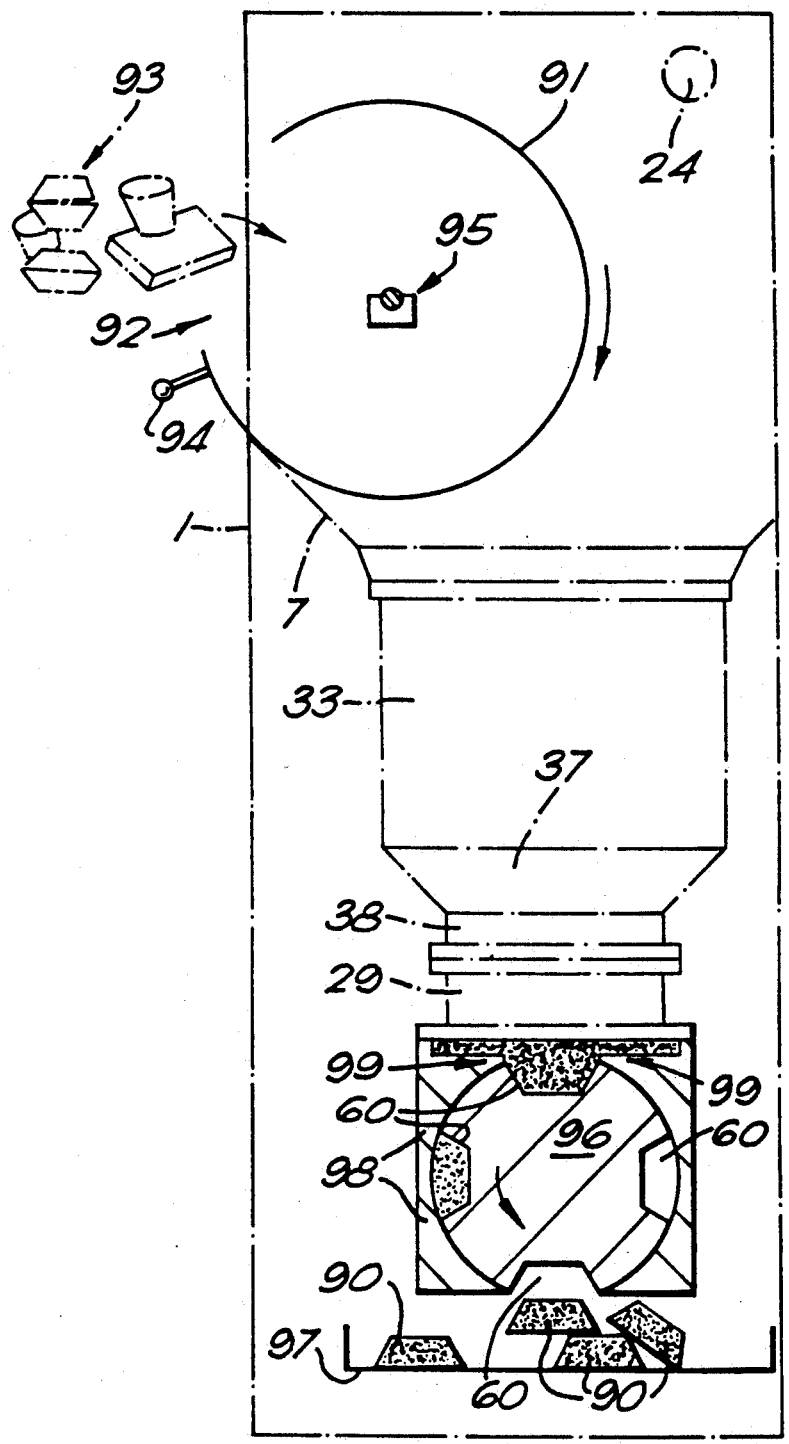

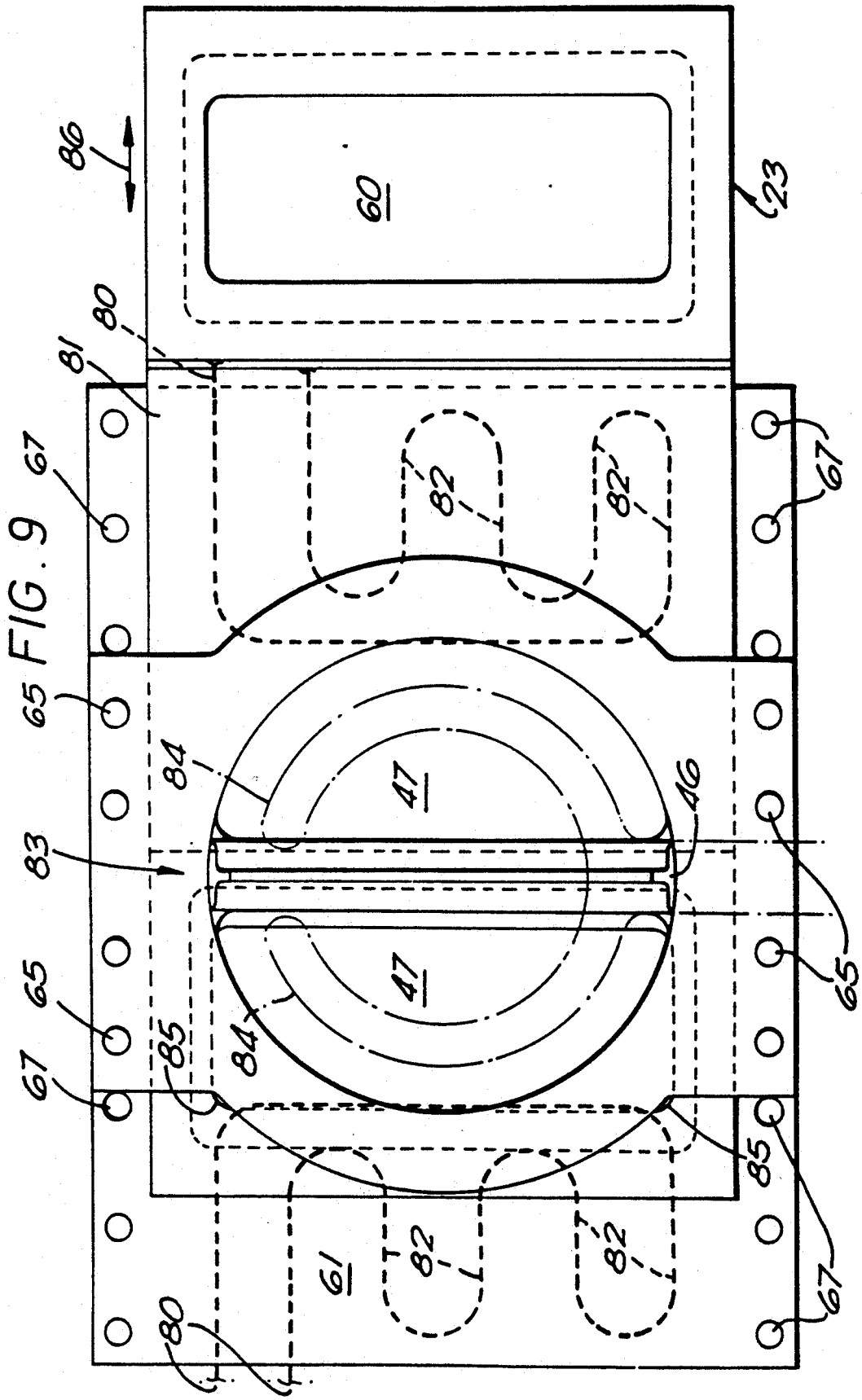

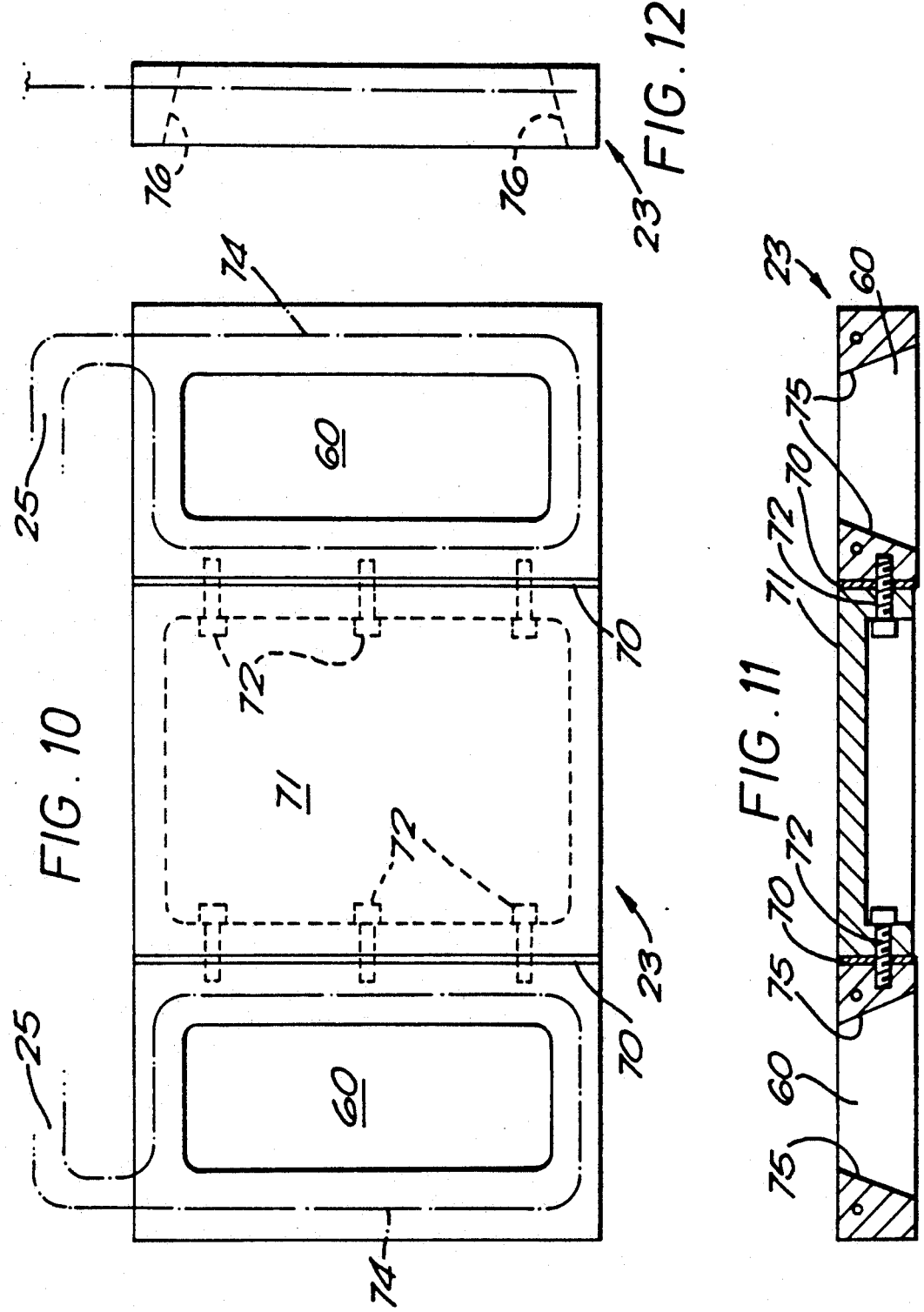

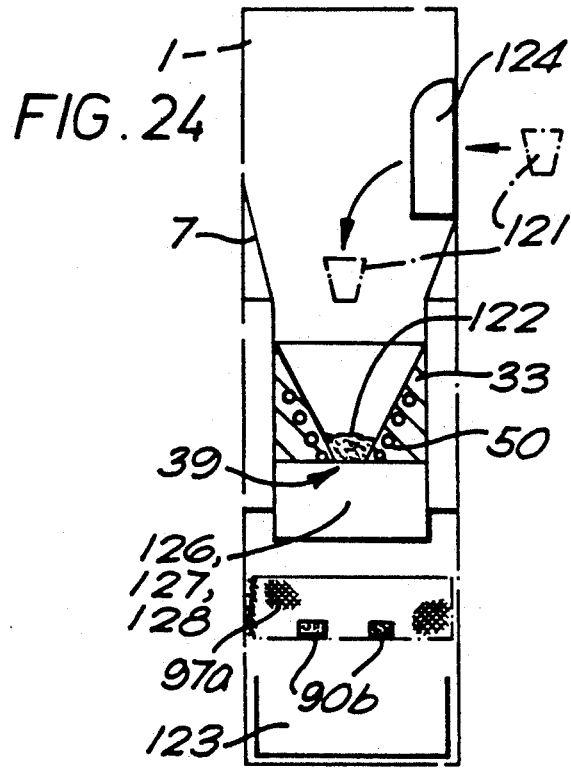
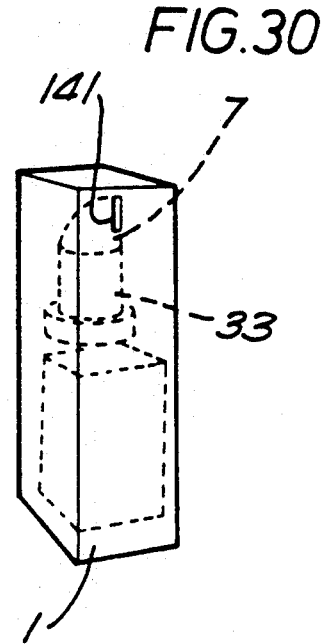
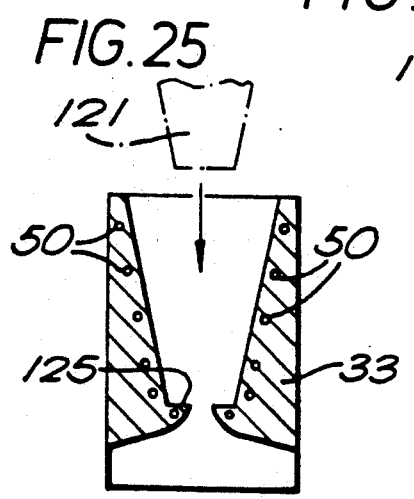
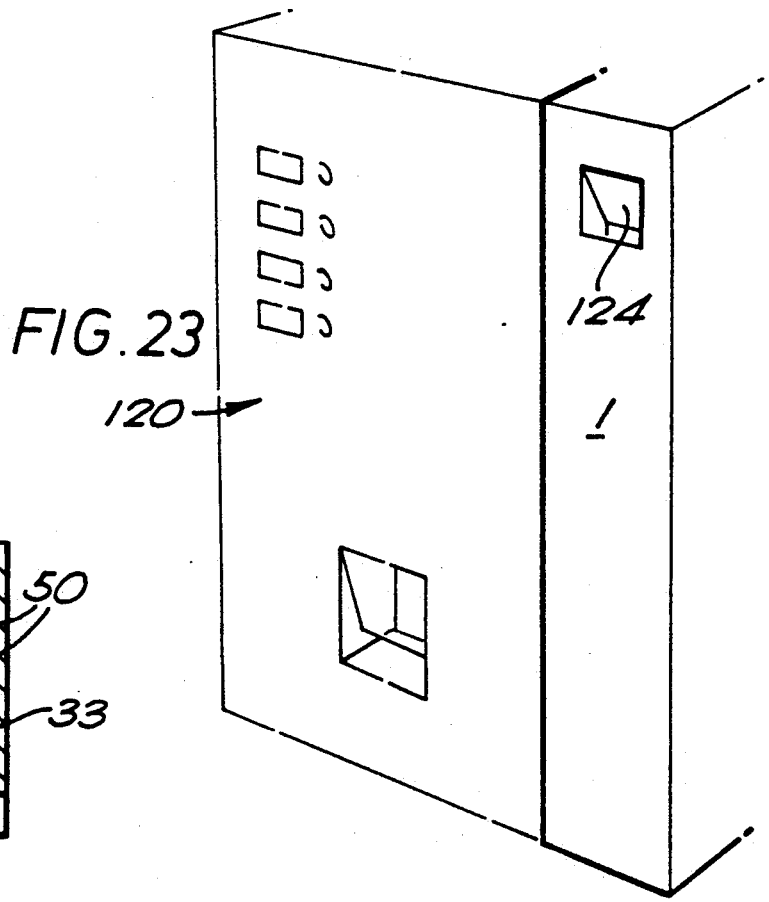

TREATMENT OF WASTE

BACKGROUND OF THE INVENTION a) Field of the Invention

This invention relates to the treatment, disposal or management of waste, in particular waste plastics.

Plastics in one form or another enters into almost every aspect of our daily lives. Expanded polystyrene (EPS) which is well known and used for its insulation and shock absorbent properties because it has the characteristics of 3 to 7% solids and 95 to 99% air or blowing agent is encountered in fast food restaurants as clam shell containers for hamburgers and drinks cups, as plates and trays in sandwich bars and fish and chip shops, as pizza trays, as agricultural containers for seeds and plants; as alternative disposable cups and plates etc., to conventional crockery, as cups at vending machines as yoghurt and frozen yoghurt pots, as boxes to transport certain perishable foods such as fish and eggs, as fruit trays, and as protective packaging for a wide range of goods such as telephones, so-called white goods, e.g. refrigerators and cookers, and televisions.

The consumption of plastics cups alone, mainly from vending machines, has reached some 3,000,000 per day in the UK and 60,000,000 per day in the U.S.A. where, in one factory with around 500 staff, it was ascertained that as many as 3000 cups were consumed in one day.

Other plastics materials which are in common use are as follows: polyethylene which as high density and low density polyethylene (PE) is used for containers such as refuse sacks, carrier bags and even specialist containers such as blood and plastic containers and as expanded polyethylene (EPE) is used in film or in sheet form for protective wrapping and packaging easily damaged items in the electronics, glass, china and furnishing industries; polystyrene (PS), high impact polystyrene (HIPS) which is used for making cutlery and some kinds of beverage cups; Oriented polystyrene (OPS) as used in the packaging catering and confectionary industry polyvinylychloride (PVC) which is somewhat clear and is used for packaging and wrapping films and for containers such as blister type packages for articles of various kinds; ABS which is used for many kinds of containers such as cups, yoghurt pots and butter and margarine containers; polypropylene (PP) which can be very clear and is used in general packaging where a clear view of the packaged article is required without discoloration, eg for food containers as the container covers and for packaging clothing such as shirts, and other articles such as sheets and curtains, and expanded polypropylene (EPP) which is used for its insulation and impact resistance properties as say end blocks for transporting computers and for automobile bumpers or fenders.

In fast food restaurants the consumption of plastics is monumental, and represents a considerable problem. Staff have to be diverted away from profitable work to empty the waste containers which can cost up to £45 per hour. Moreover, it has become the vogue in U.S.A. for a dinner party, picnic or barbecue, to avoid any washing up to have total replacement plastics so that all that needs to be done after the meal is to wrap up everything in a plastics table cloth and throw away to the garbage bin.

Whilst plastics and articles made therefrom are relatively inexpensive to manufacture, are inert and do not contribute towards the continuing destruction of our natural timber resources as does the production of paper, plastics are increasingly being given a bad press because of the problems plastics waste causes to the environment. The advantages of the inertness of plastics become disadvantageous when it comes to their disposal as the plastics does not dissolve in the ground or otherwise biodegrade. Incineration is not the answer because of the emission of "greenhouse" gases and the danger of emission of noxious gases, if carbonization occurs which can require the cost prohibitive installation of suitable filtration equipment.

The search for a satisfactory biodegradable plastics has still not been really successful. Currently available biodegradable plastics reduce shelf life which encourage waste and consumption and generally are starch based around a plastics "skeleton" anyway. In any event, there has been no reliable body of evidence that biodegradable plastics will not harm the environment. An all too familiar sight nowadays is the presence of waste plastics in the environment, presenting a hazard to wild life and being a continual eyesore. It is blown around our towns and cities, into the parks, about the countryside; it is present at the seaside and on the beaches, it floats in the seas and oceans and can end up in places which have not hitherto been visited by human beings. Imagine that 200,000 tons of waste EPC would cover the surface of the world to a depth of one foot.

The principal method of disposing of plastics waste is by burying in landfill sites. In the UK alone, it is estimated that 1.4 million tonnes of waste plastics is buried each year in landfill sites around the country. Approximately 5% by weight and 50% by volume is attributed to EPS. In an untreated state, backfilling "raw EPS" consumes a site's capacity inefficiently and deems the landfill site useless for all but the most basic of uses. Obviously, building on such landfill sites cannot be entertained because of the danger of subsidence. Moreover, landfill sites are becoming increasingly remote from the points of refuse collection, thereby further increasing transportation costs.

Moreover, because of its high volume to low weight ratio (particularly EPS products) the cost of transporting plastics waste to landfill sites, is enormous. The human resource and the amount of fossil fuels consumed in transportation are high and the latter also contributes in no small way to environmental pollution. Moreover, sites available for landfill are becoming increasingly scarce. In countries such as Germany where the geological structure prohibits landfill (the underlying rock is very near the surface) the waste plastics to be disposed of by landfill has to be transported to another country, e.g. France, where landfill is possible and sites are available. In Japan 85% of the people live on 10% of the land, so incineration wins over landfill as the waste plastics treatment of choice.

And, if nothing is done, the situation can only get worse because the population of the world has grown from around 2.5 billion in 1948 to 5 billion at this time—in 1991—and is now increasing by about 83 million each year. It has been stated that to satisfy the needs and expectations of this population explosion, the Earth's natural resources and species are being destroyed and polluted on a scale which is now threatening the very life support systems of our planet. The havoc being inflicted on our habitat ranges from damage to the ozone layer, to destruction of the tropical rain forests;

from pollution of land and water to desertification and the wholesale extinction of animal and plant species.

Due to environmental pressure, there is a backlash against the use of plastics which is beginning to cause its replacement by paper and cardboard in certain areas, eg. egg boxes, plates, cups, and clam shell containers. One industry in which replacement has begun in the USA is in the fast food industry. However, this is environmentally unsound as the more paper and cardboard that is used, the greater is the depletion of our natural timber resources. And contrary to popular belief, paper and cardboard does not readily biodegrade, particularly in dry conditions which can be encountered in some landfill sites and the affect of printing inks on the environment has still not been fully assessed. Indeed, the leachate released from paper and cardboard degradation in landfill sites could pollute water supplies and create methane gas with its attendant problems. All around there is a growing environmental pressure, not only to find replacement materials for plastics which will not pollute the environment and to step up research into biodegradradable plastics, but also to dispose of the enormous volume of plastics waste in a more efficient and environmentally friendly manner. All plastics waste must be contained on board ships, at sea, due to recently passed International Maritime Laws, which is a major problem as a high percentage of the waste is contaminated with organic matter.

The focus of mainstream research, nowadays, is on recycling. Recycling for reuse has become the name on everyone's lips and a function which most of us perform to some degree or another. Recycled paper is in common use. eg for envelopes, but it is not generally known that the chemicals used to dissolve the printers ink out of say newsprint and printed paper and cardboard packaging produces an effluent which is extremely damaging to the environment. Moreover, the energy consumed in the recycling of paper and cardboard is not low.

Recycling has become of such importance that bottle banks have become a common sight in our towns and cities, and door to door collection of waste paper and textiles have become a feature of our lives. Skips are available also for the disposal of waste which is not mixed up with organic materials of the kind ordinarily found in domestic and industrial refuse. Thus, such skips which contain glass, cardboard, paper, wood, textiles, metals and plastics films and plastic bottles from domestic and industrial sources can be collected and taken to a recycling plant. One such recycling plant sorts the glass, metals, wood, contaminates, plastics, paper textiles, waste and burnables from each other. The plastics and paper are fed to a bale press, the bales are fed to a shredder, and the shredded plastics washed, dewatered, dried and then sorted with hydrocyclones. The sorted plastics is fed to an extruder and the molten plastics passed through a die which produces plastics threads that are cut into pellets by means of rotating blades. The plastics pellets are packaged to be ultimately formed into lower grade plastics products such as coat hangers, flower pots, garden hoses, pipes, sheeting and bottles etc. The plastics is downgraded, because of its melt history, being a mixture of different kinds of plastics and cannot take colour pigments, so that the products end up a dull grey/brown/green colour.

Another plastics recycling process uses waste articles made mainly from thermoplastics, in particular high and low density polyethylene and polypropylene. Other thermoplastics such as PET and ABS can be recycled but under certain controls and PVC may only be present in small proportions without special additives being used. The sources of new material for this process are manufacturers of plastics articles, ie, film, bags, tableware, syringes, toys, book bindings, trays, various domestic articles, e.g. containers and bottles, milk, suppliers who produce their own plastic milk bottles and who have redundant and broken milk crates, beverage companies who use plastics bottles and containers, and who have broken beer crates, large volumes of below standard articles, e.g. piping, ducting, plastics joints, disposable plastics medical goods, head waste from manufacturers of plastics articles from starting up the machine and after shutdown, plastics packaging to be disposed of by manufacturers, distributers and retailers and contaminated or sub-standard granules from plastics processors.

The collected plastics material is sorted, granulated, mixed/blended and then plasticized in an extruder consisting of a large steel screw in a heated steel barrel, by means of the friction caused by the rotating screw melting the plastics. The plastics used in this process can include up to 1% contaminants, such as paper, but any more can cause unacceptable wear to the extruder barrel and screw. Because of this wear, the use of contaminated plastics in extruders which are in general use in recycling to reuse is prohibitive above 1% contamination level. Extruders are expensive machinery whose parts are expensive to replace, require skilled and specialist operators and can generally only be used to recycle homogenous plastics waste. This process can produce basic solid plastics elongated product such as posts, poles, stakes, boards and a variety of similar shaped products, but again the plastics is of down graded nature and could not be mixed with virgin plastics. Specific use of the product are slatted floors for farm animals, pallets, underground cable covers, fencing posts and street and road furniture. Again these products are a dull colour as they cannot accept colour pigments but special painting and one-colour plastic coating processes have been devised.

Another recycling process involves the plastics cups supplied by the makers of beverage vending machines. One supplier has devised a method of collection from the sites of use. This involves supplying collection receptacles with drip trays at the vending machine locations and arranging for periodical collections. One collection cycle involves two trucks, two drivers and three support staff. It has been found that the collection receptacles for these plastic cups can contain as little as 40% by weight plastics waste and as much as 60% by weight organic waste comprising say, coffee, milk, sugar, soup etc. This can result in a hygiene problem as the organic material in the collection receptacles begins to support bacterial growth and to smell, giving rise to complaints. The plastics cups have to be cleaned to remove the organic contaminants before being recycled to reuse using known extrusion techniques. And even though one would have thought that the same plastics used for all the cups would be identical, variations do occur in the same plastics from different manufacturers, eg Mobil and Shell, which results in downgraded recycled plastics product.

It is worth at this stage examining more closely the thoughts behind re-cycling. As well as endeavouring to protect the environment, one of the main factors in re-cycling is to preserve the natural resources of oil and gas. It is a recorded fact that of the volume of oil produced only 5% is used in the packaging industry, 95% is burnt, the majority by the internal combustion engine. It would be a brave government that would tackle that particular problem head on. So ever eager to win votes without taking risks they have targeted the packaging industry as being the main aim in their legislation for re-cycling. However, it is important to recognise that environmental protection must encompass the use of all resources, including labour, land, materials and capital energy.

If therefore the stated aim is to protect natural resources does the question of re-using waste EPS stand up to scrutiny ? As already mentioned, the treatment of downstream post consumer plastics (that is plastics waste) presents inherent difficulties.

1. There needs to be separation of the waste into polymer type according to compatibility, 2. It needs to be washed, with the consequent use of a resource which we are told will become scarcer due to global warming, 3. It needs sophisticated separation machinery, which is energy consuming, 4. The capital cost is high, an effective plant could be in excess of £1,000,000

5. The problem of transporting the waste to the plant is still relative to the 90% or so of air or blowing agent that is being carried.

6. The excess movement of heavy vehicles is damaging to the infrastructure and the exhaust emissions are environmentally unfriendly.

The total use of energy is calculated to be nearly three times as much as that used to produce the original packaging. How then is it possible to conserve the source of energy and yet satisfy the demands of the governmental bodies for extending the life of the plastics?

Any person of ordinary skill in the art in the plastics industry would tell you nowadays that the way to handle EPS waste is to burn it. Incineration plants have been set up, which have been successful in burning mixed waste, but there are shoals of statistics which will tell you how profligate we are to waste this energy source and there is the high capital cost of the plant.

Whatever, may be said in public the Applicants' research shows that there is no firm operating recycling without incurring a significant loss in the process. Some recent French research concluded that only 70% of costs are recovered in a typical recycling operation. Also, in logic, recycling does not solve environmental problems. It operates merely to delay the disposal of plastics by the community. Thus recycling processes, in making a loss, are in the final analysis environmentally unacceptable as they deplete both capital and human resources.

Accordingly, plastics produced for reuse from plastics waste which has been recycled cannot compete with regard to cost and quality with virgin plastics, unless one is dealing with uncontaminated factory scrap plastics which can be fed back into the processing chain for extrusion. Contaminated plastics waste has to be subjected to a number of operations before it is suitable for granulation or pelletization, such as crushing, shredding, sorting, washing, dewatering and drying. Moreover, there is some plastics waste such as computer, audio and video tapes and floppy discs which because they incorporate metal oxide, and are contained by cassettes of different plastics materials cannot be recycled in currently available recycling plant. And moreover, incineration is prohibited because metal oxides when burnt give off noxious gases.

Credit cards which have to be destroyed for one reason or another, eg because of mistakes made in personal details during manufacture present problems as they are contaminated with metals and print. At present damaged credit cards are presented edge on to a shredder and are collected for transport to an incinerator. But it has been known for cards to miss the shredder knives and thereby give rise to a security risk. Moreover, expired credit cards are normally destroyed by cutting in pieces and disposed of into the refuse cycle. This represents a considerable quantity as, in the U.S. alone around one billion credit cards are in circulation at the present time.

Even EPS used in a protective role in packaging is more often than not contaminated with eg wood slivers from pallets, bar codes made of paper or cardboard, and shrink wrap or straps made of different plastics material.

EPS fish boxes, which because of their insulation properties, can give at least an extra day's "shelf" life to the packed fish once removed from refrigeration, present particular problems in disposal. This is because, once used, they are contaminated with fish scales and slime, become smelly and are a health hazard. Moreover, used fish boxes have a high degree of salinity thereby precluding reduction in size by shredders and presses which would "rust" up. So, hitherto, used fish boxes have been burnt (incinerated) or disposed of by landfill. Neither of these courses is immediately open in one instance known to the Applicants, where a hotel in Europe which is snow bound during the winter, has to store large quantities of EPS fish in fish boxes to last the winter. All that can be done until the spring thaw when the roads are open to transport is to spray the used fish boxes with disinfectants to reduce the stench and minimize health hazard.

Even the waste EPS from fish box manufacturing factories cannot readily be reused because once the waste has hit the floor, so to speak, it cannot be used for food. Thus, the waste EPS has to be continuously removed. Applicants have ascertained that in one UK fish box factory, the amount of waste EPS is so high that four skips full per day have to be transported to landfill. But EPS saves the fish industry around $10,000,000 a day because it increases the shelf life subsequent to removal from refrigerated stores.

Used disposable plastics nappies or diapers which, in addition to the outer liner make use of special absorbent plastics also present a disposal problem as they cannot be flushed away into the sewage system and may also be heavily contaminated with waste organic matter which leaves incineration and landfill again as the only options available.

Plastics medical waste also presents a problem all of its own; particularly where disposable plastics syringes are concerned in view of the danger of the transfer of fatal diseases such as AIDS and Hepatitis B from accidental needle strike. Not only is plastics medical waste contaminated with organic material but also in some instances with metal of which the prime example is syringes.

In addition to the drive to recycle waste plastics to reuse to make new products, environmentalists are also pressing for a reduction in the amount of plastics packaging used overall and reuse of plastics packaging as many times as possible.

Examination of these options with regard to EPS results in the finding that each has its drawbacks.

Modern packaging has been developed to cope with the demands of modern living, and it is because of this development that it is now possible to reduce considerably the amount of damages experience in the transit of goods. It is also true to say that the insulation and sealing of food has helped to increase the shelf life of many food products. It is therefore difficult to see an economic alternative.

Indeed, a leading German research firm has assessed what would be the environmental impact if plastics packaging was replaced by the best alternative in each individual application. The results were most significant and one: Energy consumption would double; raw material consumption would quadruple; the volume of waste would increase by 150%; and the cost of packaging would double.

To reuse the goods is laudable but in certain industries such as food this would not be practical because of the contamination of the wrappings.

The plastics industry is seen to be very efficient at reclaiming it's own waste at source. The fact that there is a percentage of the blowing agent left and the fact that the materials are homogeneous makes it easy to re-introduce the waste into the manufacturing process. It is claimed that the waste factor is now as little as 1%. However, when the plastics packaging is moved downstream to the end consumer, problems begin to arise. Firstly, as has already been discussed, to be, properly processed the plastics need a complimentary polymer profile. Secondly it is inevitable that the product will become contaminated in use.

Thus, landfill is still the most popular way of management of plastics waste, despite all its disadvantages. But there has increasingly become a desperate need for environmental reasons to solve the problem of plastics waste management as landfill sites are becoming more and more scarce, the pressure from environmental groups is increasing and recycling as the sole alternative is financially unviable.

b) Description of the Prior Art

Applicants are aware of known apparatus for melting plastics waste, all of which cannot cope with contaminated plastics waste for reasons which will readily become apparent.

Thus, DE Gebrauchmuster G 85 25 903.9 discloses an apparatus for the destruction of data stored on microfilm to guard against reenlarging and espionage, by liquifying the film material in an electrically heated sealed metal container which has electrical heating elements in its wall. The metal container has a specially designed nozzle situated in its base through which the liquid material is removed in droplet form i.e. an interrupted flow, under gravity. The droplets are converted into granules by the cooling action of air on the granules as they fall over a set distance into a receiving container which can be pulled out like a drawer. Interrupted droplet flow is essential to such apparatus in order to produce a granule size which would prevent the possibility of any reading by reenlargement. Such an apparatus would not work with contaminated plastics waste as the contaminants would block the fine nozzle and the disposition of the heating elements would not provide the requisite melting effect.

Patent Abstracts of Japan, volume 9 No. 311 (M-436) (2034), Dec. 7, 1985 and JP A, 60145809 (Masaki Tomizawa) Aug. 1, 1985 disclose a method of lowering the treatment cost of waste resin by providing a combustion resin passage for feeding part of waste resin that has been melted in a melting tank by steam pipes and by a heating burner to a resin burner where it is burnt. When the resin burner becomes operated in a steady manner, the heating burner is stopped and the apparatus is operated using only heat from the resin burner. Waste resin from the melting tank runs downwards under gravity through a resin discharge pipe and is heated by molten resin running through a passage which feeds the resin burner and surrounds the middle and upper portions of the discharge pipe. Again, such an apparatus would not function with contaminated plastics waste because the passage ways and discharge pipes would become blocked. and resin burning is environmentally unfriendly in giving rise to greenhouse gases.

In GB 1,572,623 a combination of a melt chamber and an extrusion screw is used to produce molten plastics from foamed thermoplastics head waste of scraps, odds and ends, chips and cut ends produced during the processing of plastics and synthetic resins for producing good quality recycled pellets. The extrusion screw extends horizontally beneath and is fed from an elongate melting chamber which is V-shaped in cross-section and extrudes threads of plastics through a suitable die. To prevent reverse upward movement of the foamed plastics waste, the melting chamber is provided with a plurality of fins which project towards each other from the chamber walls on opposite sides of the V. As has already been explained, such apparatus, in using an extruder is expensive, to buy, operate and maintain, and cannot deal with plastics waste which has greater than 1% of contaminant and even this percentage will depend upon the nature of the contaminant. Some contaminants will cause blockage of the extruder and others will cause unacceptable wear to the extruder screw and barrel involving enormous replacement expenditure.

In another apparatus involving an extruder, the extrusion screw is arranged vertically but this apparatus suffers from the same disadvantages as those of an extruder having a horizontal screw.

With apparatus involving extrusion, additional pressure is required to melt the plastics waste and to force the molten plastics waste through a die.

It is within this context and in response to a long felt want that the Applicants' invention was born.

SUMMARY OF THE INVENTION

Applicant has discovered a principle which is that contaminated plastics waste can be reduced in volume without necessarily recycling or recycling to reuse to obtain a solid product having a high weight to volume ratio. The effect of this discovery is not only surprising but also of considerable significance as will hereinafter be discussed.

In order to carry this principle into effect, and in accordance with one aspect of this invention, the volume of contaminated plastics waste is reduced by densifying the plastics waste.

By means of densification, the use of crushing, shredding, washing, dewatering drying or incinerating apparatus, which represent a high capital cost, may be complex to operate and costly in terms of energy and maintenance to run, is avoided. And moreover, densification need not give rise to any gases which are harmful to human beings or to the environment and which are released on carbonization or decomposition.

The invention may be expressed in terms of heating contaminated waste plastics to a temperature which is sufficiently high to melt the waste without carbonizing, decomposing, or burning to produce a controlled melt.

The controlled melt represents an important feature of this invention because it enables the melting temperature of the plastics waste to be kept within tightly defined parameters which prevents burning or decomposition but removes any gases present in the plastics waste or produced by vaporization of any contaminants therein. The gases produced by the densification process according to the invention are harmless, it being a simple matter to vent off such gases, conveniently by means of a suitable extraction means which is connected to a vent such as a flue via a filter, e.g., a carbon filter for the purpose of removing any odors.

Control of the melt is ideally achieved by utilizing heating in a particular way. Thus, from a further aspect the invention consists in densifying waste plastics by heating to produce a melt which is controlled by applying heat in the region of the middle of the melt.

For plastics waste which contains a gas such as air, the invention, from another aspect, consists in the step of removing the said gas to densify the plastics waste, which step conveniently also involves melting the plastics waste.

The temperature of the melt will depend upon the melt index of the constituent plastics of the plastics waste. For example, for EPS plastics waste which can contain as much as 95% to 97% air and has a high volume to weight ratio, the preferred temperature range of the controlled melt is 170° C. to 210° C. EPS typically melts at 170° C. at least in its uncontaminated form.

However, the invention is equally applicable to plastics waste other than EPS and to mixtures thereof, in particular mixed waste with at least 50% EPS content. Other plastics which can be used in the present invention include the oil based polyolefins which in themselves have been created from a finite energy source. Thus, the present invention envisages utilizing plastics waste which consists of or includes polyethylene (PE), expanded polyethylene (EPE) polyvinylchloride (PVC), ABS, polystyrene (PS), high impact polystyrene (HIPS), oriented polystyrene (OPS), polypropylene (PP) and expanded polypropylene (EPP).

Rather than burn or ignite, ie have a flashpoint, some plastics decompose at certain temperatures. Thus, it is essential that the temperature of the controlled melt does not rise above the decomposition point of these plastics in order to avoid giving-off toxic fumes. For example, in general, PP melts at about 170° C. and decomposes at about 300° C.; PVC (P) melts at about 130° C. and decomposes at about 185° C. to about 200° C.; PVC (w) melts at about 150° C. and decomposes at about 185° C. to about 200° C.; PS melts at about 160° C. and decomposes at about 200° C. and ABS melts at about 205° C. and decomposes at about 290° C.

The controlled melt may advantageously be produced by use of zonal heating which involves a plurality of zones which may range from 2 to 4 or more zones at temperatures which are controlled below the carbonization or decomposition point of the plastics waste. Thus, the temperature employed increases in the direction of movement of the plastics waste from an entry zone where the plastics waste is beginning to loose its volume and shape but is not yet melted fully to an exit zone where the plastics waste is molten and is in a flowable condition.

Indeed providing that the exit zone is at the requisite temperature, heating upstream of the exit zone need not be essential, although for optimum results it is desirable that there is a gradual increase in temperature from the entry zone to the exit zone.

Thus, it is advantageous in accordance with a further aspect of the present invention to maintain the flowable condition of the molten plastics waste through the exit zone by maintaining the temperature of the exit zone at a sufficiently high value, eg heating the exit zone, so as to produce a continuous flow of the molten plastics waste out of the exit zone, beyond which solidification of the molten flow of plastics waste can take place, to produce a continuous succession of solidified bodies or products.

For the treatment of contaminated plastics waste, the dimensions of the exit zone need to be such that any contaminants in the molten plastics do not interrupt the flow or cause any blockages. For example food products such as hamburgers which have been thrown away with say clamshell containers from a fast food restaurant, will not in accordance, with the invention cause any problems. Thus, the combination of the features of size and heating of the exit zone facilitate the melt treatment stage and the solidification stage thereby enabling the invention to provide for a continuous flow, from plastics waste entry to molten plastics waste solidification.

Preferably, the flow from plastics waste entry to molten plastics waste solidification beyond the exit zone is by gravity. This simplifies the process enormously as any additional mechanical means are not required to assist the flow.

Thus, from a still further aspect of the invention a method of treating plastics waste consists in melting waste plastics in a controlled manner such as to avoid carbonization or decomposition, producing a continuous gravitational flow of molten plastics through an exit zone, and solidifying the molten plastics after it has emerged from the exit zone.

The gravitational flow conveniently results in the production of a column of molten plastics emerging from the exit zone for solidification.

From yet a still further aspect of the present invention a method of treating contaminated plastics waste comprises, heating the plastics waste in a melting zone to melt the plastics waste and heating the molten plastics in an exit zone which is downstream of and beneath the melting zone with the exit zone having a cross-section of such an area that molten contaminated plastics waste can flow under gravity without interruption out of the exit zone.

Thus, other than gravitational pressure no additional pressure need be exerted on the molten plastics to ensure its continuous flow through and out of the exit zone.

Preferably, the column of molten plastics has a viscosity level which facilitates relatively rapid solidification, i.e., is not too liquid but is not so solid as to inhibit continuous flow and the forming of a shape during solidification. Thus, the consistency of the molten column is ideally like that of dough or paste, ie viscous but not too viscous at any points across its cross-section which would cause the material of the column to bridge and thereby stop flow. Putting it another way, the molten plastics has a viscosity which causes it to ooze out from the exit zone ie the flow is ooze-like. This is why it is important for heating to be at the correct level in the exit zone. The viscosity will also, of course, depend upon the nature of any contaminant inclusions in the controlled melt and thus in the molten plastics column which is flowing out of the exit zone under the influence of gravity.

Solidification may be achieved in a variety of different ways which involve reduction of the temperature in some way or an other. Thus a coolant fluid may be used, such as ambient or cooled air, or a cooling liquid may be used. In the case of a cooling liquid, the leading portion of the column which is emerging from the exit zone is formed into a shaped solidified product in a moulding zone which is downstream of the exit zone and in alignment therewith.

Depending upon what is required in practice and whether or not a reservoir is needed to provide sufficient dwell time for sterilization the time taken for molten plastics to flow out of the exit zone and be ejected from a moulding zone can range from 30 seconds during operation to 5 minutes for the last portion to flow out at the end of a melting operation. From filling through cooling to ejection can take from about 3 minutes to about 5 minutes.

To intensify the cooling effect, the coolant fluid may be subjected to a coolant fluid flow which is circulated, preferably in a closed circuit in and out of the area which is downstream of the exit zone, which area may include the moulding zone.

In this specification the term "solidified" includes within its ambit products which may have just been moulded and which are only partially cooled and may still be somewhat hot and viscous in the interior thereof but have sufficient of a skin to maintain a shape and also those products which have become completely solid, vitrified etc throughout and are fully cooled.

In order to facilitate and even ensure that the continuous gravitational flow of the molten column out from the exit one is not impeded or even halted by the moulding zone, the invention preferably includes the step of venting the air from the moulding zones.

Once the molten plastics waste has entered the moulding zone, to facilitate cooling, the moulding zone is moved out of alignment with the exit zone, which severs the molten plastics in the moulding zone from the column, and into a location in which the moulding zone is thermally isolated from the exit zone and in which the coolant can exert its effect to cause solidification after which the solidified product can be ejected or otherwise removed from the moulding zone. Ideally, gravity is the agent of ejection, assisted by shrinkage of the cooling solidifying product but also advantageously the moulding zone has a shape which further assists gravitational ejection.

The speed of operation can be increased if another moulding zone is brought into alignment with the exit zone during cooling of the first moulding zone.

The system of moulding zones provides for automatic gating of the molten plastics waste. Until gating/severing of the column occurs, it is desirable, also to heat the moulding zone from below so that the molten plastics charge in the moulding zone does not begin to cool too quickly to prevent gating. Such heating will of course be stopped when the moulding zone is moved to be replaced if so desired by cooling from below.

In another method which does not involve a moulding operation as such, the molten column is allowed to flow through the exit zone into a space where successive portions of the column protruding from the exit zone are cooled by a liquid or suitable gas. The protruding portions of the column are severed therefrom as by a knife or knives which may be heated, and then allowed to drop under gravity into a suitable receptacle which in itself can be liquid cooled to increase speed of solidification. In such a case, each solidified product will have a cross-sectional shape which corresponds to that of the exit zone.

Thus, in accordance with another aspect, the invention consists in a solidified product produced from a controlled melt of contaminated plastics waste and which surrounds, contains, carries, supports or encapsulates any contaminants therein and which preferably has a shape which has been formed during solidification.

The reservoir can provide a dwell time which is critical to sterilization causing dessication of organic contaminants, size reduction and allows the dessicated organic contaminants to become part of the melt.

By arranging for the controlled melt to have a sufficient dwell time, eg by producing a reservoir of the melt, or to be at a specific temperature or within a specific temperature range, any contaminants within the melt will be sterilized, thereby to produce a sterile solidified plastics product including contaminate. The reservoir can be of any convenient depth to provide for a sufficient dwell time and can comprise the molten plastics column or alternatively, the reservoir can include or be upstream of the exit zone. This represents a considerable advantage as such sterile solidified product is not a health hazard, can be disposed of to landfill without harming the environment, with enormously reduced transportation costs due to its reduced volume and can even give value to the landfill site by enabling its reuse, eg for building.

By forming the product to a shape of say generally rectangular configuration, eg of brick shape, such as a briquette, the solidified product may be stacked. This represents a further advantage in space saving eg in landfill and in transportation and is particularly important where space may be at a premium such as on board ship or in a snow bound hotel.

To give some idea as to the reduction in volume achieved by virtue of the present invention in the case of EPS, a solidified product was produced whose volume was reduced by some 99%. By way of specific example an EPS television pallet 80 mm×1200 mm×1100 mm was reduced in volume in accordance with this invention to a solidified product in the form of a briquette 50 m×230 mm×100 mm. Such a sized briquette could also be produced from 200 regular EPS clamshell containers and from 250 regular EPS food trays or even from 1000 12 fluid oz EPS coffee cups. Contaminants such as uneaten food, paper tissues or other organic materials are encapsulated in the solidified product and are partially size reduced by dessication.

Not only does densification according to the invention enable a reduction in volume but also a reduction in shape which in the case of EPS greatly reduces transportation costs, by as much as up to 99%, but also allows more efficient use of landfill disposal capacity.

In order to fine tune the control of the melt which is of particular importance in the exit zone, heating of the exit zone advantageously takes place in the central region of the melt at least in the molten plastics column and may even extend into the next adjacent zone upstream of the exit zone, as well as peripheral heating.

Further controls may be instituted by continuously sensing the temperature of the melt and/or the heating temperature at the most appropriate location(s) so that if the heating and/or the melt temperature rises above a preset threshold eg 250° C. for EPS, heating is stopped. In the unlikely event that any or all of these controls failed and fire did occur, provision may be made for extinguishing such a fire. Likewise noxious gas sensing may be provided as a further control, just in case those plastics whose decomposition causes the emission of such noxious gases do decompose.

In accordance with a further aspect of this invention heating in all zones to render the plastics waste molten takes place within an open volume which may be sealed if desired or necessary.

This open volume is conveniently defined by a chamber which is made of a material of high conductivity such as a metal of which aluminium is preferred although nickel and copper based alloys such as bronze or brass will be suitable for practising all inventive aspects.

To provide even heat transfer to the melt, the use of at least one electrical resistance heating element which is arranged in a particular configuration and location relative to the melt to provide even heat transfer and avoid any "cold" spots is preferred. Ideally the or each heating element is of optimum length, eg at least 2.5 meters, to reduce linear loading and give a linear watts density which increases longevity of the heating elements so as to minimise the risk of unnecessary electrical heating element failure.

In one advantageous configuration of electrical heating elements, the or each heating element is in the form of a plurality of loops with the direction of the loops being generally parallel and extending around the melt.

Even heat transfer is enhanced not only by the looped arrangement of heating elements but also by embedding the heating element loops in the chamber wall at locations which are nearer the inner wall (ie nearer the melt) than the outer wall.

Insulating the chamber wall is also advantageous as it assists in the maintenance of even heat transfer and prevents undesirable loss of heat.

Heat transfer is further assisted by casting the chamber wall of a non-ferrous metal and casting in the heating elements at the same time that the chamber casting is formed such that there are no inclusions of air around the heating elements to result in the formation of local "hot" spots which will cause electrical heating element(s) failure. Cast-in heating elements enable thicker and longer heating elements to be employed and maximum contact with the chamber wall, providing an even heat profile. By arranging the loops of the heating element(s) closer together in the exit zone continuous flow of molten plastics therethrough may be more readily achieved.

Heat transfer in accordance with this aspect of the invention may be by conduction and by radiation and provide a wall inner surface temperature of 200° C. ie at the periphery of the melt and a temperature of 190° C. at the centre of the melt for EPS. A 10° C. graduation from the periphery to the central region of the melt provides uniform heating and thus a controlled melt with the requisite heating profile.

By way of example, the invention enables the rapid conversion of used polystyrene plastics packaging, cups and clamshell containers into easy to handle briquettes. It even melts down plastics cutlery. A truckload of garbage is reduced to a pile of briquettes that could fit into a small suitcase. Such briquettes are clean, sterile, stackable, blocks each of which, in one embodiment of the invention, weighs less than 2 kg. Wherever polystyrene foam is being discarded as waste be it in a fast food restaurant, warehouse, store, airport, ship, or industrial premises, the present invention enables it to be disposed of quickly, safely and efficiently before it becomes another expensive truckload of litter.

Thus, the plastics waste can be fed straight into the process without any size reduction but, the invention also covers situations where say EPS television pallets have been reduced in size prior to feeding in. Also where say uncontaminated head waste is being dealt with on site, the head waste may be granulated and introduced into the process in a stream of air.

Densification practised in accordance with the invention dramatically reduces the cost of polystyrene foam disposal, is environmentally friendly (up to 99% less volume equals up to 99% less fossil fuel wastage,) avoids air pollution and visual eyesores associated with plastics waste, is user friendly in that it does not require the use of mechanical grinders and cutting blades to achieve the reduced volume, and the running costs can be made very low, eg from 1.5 kw to 15 kw rating depending upon the capacity of the apparatus used to carry out the densification.

Whilst recycling was not in Applicants mind when the principal behind this invention was discovered, Applicant has ascertained that, environmentally, the invention is even more friendly than was first thought to be the case. Reduction in landfill space and in transportation costs has already been discussed herein. But, the invention goes further than that. In tests carried out on solidified products produced in accordance with the invention, Applicants have found that a solidified product produced from densified EPS plastics waste and which occupies up to at least 95% less structural space than the original not only has a similar calorific value to fuel oil but has over 150% the calorific value of coal of the same weight.

Accordingly, the invention also consists in a method of treating contaminated plastics waste, such as EPS, which method comprises densifying the plastics waste, solidifying the densified plastics waste to produce a solidified product and recycling the solidified product to energy.

The invention further consists in a solidified product produced from densified plastics waste and constituting a fuel element.

It should be appreciated that solidified products which are recycled to energy must not contain contaminants such as heavy metals which would be harmful to the environment when used as a fuel. Thus, when contaminant inclusions include metal oxides from video and computer tapes or credit cards for example, landfill represents the safe choice for disposal. This is because the metal oxides are encapsulated in the solidified products and cannot cause any harm. On the other hand, organic matter such as sugar, meat from hamburgers, or other contaminants such as factory floor dirt and dust, paper etc will not prevent use as a fuel.

As, in general, organic matter, dirt and drink will be transformed into harmless matter by a densification process utilizing the controlled melt, it is also within the purview of this invention for such solidified products to be recycled for secondary processing ie for reuse. Such recycling represents economic and environmental sense because Applicants densification process does not involve operations such as separating, washing, sorting, crushing, shredding etc which are necessary with the recycling apparatus hereinbefore referred to. Another possibility is for the solidified product to be ground up and used as an aggregate in say building or road making materials.

Furthermore, by adding suitable materials such as sawdust or sand for example, to the controlled melt, solidified products can be made which may be used as building blocks, for example.

Thus, apparatus can be manufactured for carrying out the densification process of the invention which is a fraction of the cost and uses far less energy than those of the incineration and recycling plants which are currently available on the market.

For example, the extruding system used in a typical recyling plant for EPS can cost as much as £ 200,000 to £ 500,000, let alone the cost of the washers, sorters, crushers, shredders etc., and one known grinder incinerator plant can cost as much as £ 523,000. On the other hand, densification apparatus proposed by the Applicants are projected to cost between £ 5,000 to £ 25,000 depending upon their use although a vending machine coffee cup densification apparatus could be sold for as little as £ 1000.00.

It could be said that Applicants densification process and apparatus for treating plastics waste, unlike any of processes and apparatus hitherto devised deal with the whole problem of disposal of contaminated plastics waste at a janitorial level. Contaminated plastics waste can be dealt with on site before transportation ! Thus, no longer is there any need for there to be loss making recycling to compete with virgin product.

The apparatus and method of the invention will deal with a wide variety of contaminated plastics waste as well, of course, with uncontaminated plastics waste if desired or necessary. For example it is likely to be cost effective to use Applicants process on site in a factory which has to dispose of uncontaminated plastics head waste from extrusion processes to reuse in the same factory.

All the examples of plastics waste previously referred to in this specification are suitable for treatment according to the method and apparatus of this invention.

Applicants densification method is particularly suitable for contaminated medical waste although some modification may be necessary in some instances to provide solidified products which are completely sterile to avoid any health hazard.

Accordingly in accordance with a still further aspect of the invention medical waste eg, plasma containers, catheter tubing hypodermic syringe cases, disposable scalpels etc, is densified and sterilised on site into sealed solidified products such as 'briquettes'.

Also, from another aspect of the invention, soiled nappies, diapers and sanitary towels which are typically manufactured from absorbent polymers may be treated and sterilized in a similar way to medical waste.

Because of the possible danger of leaching out of fluids from the solidified products, or the possibility of cuts and abrasions from contaminated 'sharps' such as needles and scalpel blades, it is proposed that the molten polymer (plastics waste) is gated into a tough thermoplastic high temperature outer casing which can then be sealed. The outer casing may be produced from a high temperature material with good impact and abrasion resistance such as nylon 66 or P.E.K. The case can be sized to fit a standard moulding zone cavity and be introduced into the densification chamber exit zone by mechanical, electrical or hydraulic means or any combination thereof.

Such an outer casing may have a wall thickness of around 1.5 mm and be of any suitable form. For example, a casing with a flap or lid would be forced flat by the action of the gating system and sealed into place along the open edges by a heat sealing device. Alternatively, the lid or flap could be introduced as a separate component after filling of the moulding zone cavity.

Possibly, alternatively or in addition to using an outer casing, it would enhance the process to 'microwave' the molten medial plastics waste emerging from the exit zone eg whilst cooling or solidification during the exit mode of the gating system in order to assist in sterilisation of any residual matter.

To ensure safety, a partial vacuum or back pressure may be created and any fumes be drawn off through a filtration system possibly consisting of replaceable zeolitic panels. Such zeolitic panels possibly with an electrostatic filter could be processed periodically by heat say at 1000° C. to destroy any contamination and effect regeneration.

Preferably, the melting temperature would be higher, eg 300° C., and the melt chamber wall advantageously of bronze alloy to withstand higher temperatures say AB1 or AB2 to BS 1400, which has a grain structure which is fine and would reduce risk of penetration by the molten plastics polymer waste.

Alternative container shapes for medical plastics waste solidified products include cylindrical open topped container which could be heat sealed by clamping shut a partially filled container at the top and open ended tubular containers which would be sealed at both ends.

It should be appreciated that the invention also consists in apparatus for carrying out any of the methods defined hereinabove.

The invention further consists in an apparatus for treating contaminated plastics waste, said apparatus comprising a chamber for receiving plastics waste, means for heating said plastics waste in the chamber to produce a controlled melt, and an outlet in the bottom of the chamber, the outlet and the heating being such that a continuous flow of molten plastics waste, preferably in columnar form, flows through the outlet.

In order to enhance heat transfer, the chamber advantageously has a wall made of a material of high conductivity such as a non-ferrous metal, eg aluminium and the heating is provided by at least one heating element which is embedded in the chamber wall. Advantageously the metal chamber wall is cast and the or each electrical heating element(s) is integrally cast in the metal chamber wall.

The heating elements may be arranged to surround the chamber wall and preferably comprise a plurality of loops which may project toward each other like curved fingers in substantially parallel relationship around the wall and stop just short of each other at their ends to maintain even heat transfer through the chamber wall and into the melt. Heat transfer is further facilitated by arranging for the heating element loops to be nearer the inner wall than the outer wall of the chamber. Alternatively, the or each heating element may be in the form of a helix or spiral, or a combination of loops and helices or spirals.

Moreover, the spacing between the heating element loops advantageously starts from being further apart adjacent the inlet of the chamber and nearer together in the region of the chamber outlet which assists in maintaining a continuous flow of molten plastics through the chamber outlet.

It is important that the flow of plastics waste, once molten, is not interrupted in its flow through the outlet eg by partial solidification which may cause bridging. Thus, the invention provides for heating the molten plastics waste in the region of its outlet. One way of achieving this is to arrange the heating element(s) closer together in the outlet region.

However, alternatively or in addition to peripheral heating, heating may be provided in the middle of the melt and maybe, even at the bottom of the melt.

Accordingly, from a still further aspect the present invention consists in an apparatus for treating contaminated plastics waste, said apparatus comprising a melt chamber for receiving plastics waste and having an outlet in its bottom through which molten contaminated plastics waste can flow under gravity, and means for introducing heat into the middle region of the molten plastics melt, at least in the region of the outlet.

The means for introducing heat into the middle region of the melt may be a central projection which extends upwardly, and preferably through the chamber outlet and into the chamber.

So as to minimize any risk of impeding the flow of molten plastics waste through the outlet, the projection may be tapered in the upstream direction.

In one embodiment, the projection is constituted by a web which extends across a region which is downstream of the chamber outlet and which forms an outlet chamber in which a sterilizing reservoir of molten plastics waste can be built up prior to discharge. Thus, there is formed a column of molten plastics which can be in a state of continuous flow. Actually, the web splits the outlet chamber into two outlets for the discharge of molten plastics. The projection may be made up of more than one web, eg three transversely extending members which splits the discharge outlet into three, be of cruciform shape to define four discharge outlets or even more, provided that the flow of plastics waste is not impeded.

In principle, the less contaminated the plastics waste, eg by food, the more discharge outlets there can be which will facilitate subsequent processing by solidification.

Heating of the projection involves the use of at least one electrical resistance heating element, which is preferably looped in such a way that the loops run transversely of the outlet chamber.

The heating element is preferably embedded in the projection as by casting to facilitate heat transfer to the melt and may be made of the same or similar high conductivity material as that of the melt chamber.

The outlet chamber really constitutes an extended outlet or exit zone which may provide for the requisite dwell time to ensure sterilization of any contaminant inclusions in the melt.

The outlet chamber wall can, itself be, and is preferably heated to provide peripheral as well as or instead of central heating to the melt in the exit zone. And, the heating may be effected, again by electrical resistance heating element(s) embedded as by casting in the wall of the outlet chamber. Such a peripheral heating element or elements may be of looped form or in the form of a spiral or helix or any combination thereof.

The wall thickness of the melt chamber will also have an effect upon the transfer of heat. But the interrelationship between the mass of high conductivity material eg metal wall and the kilowatt loading are critical. For, if the mass of high conductivity material is too high the melt chamber will be too slow to warm up and if the material mass is too low the melt chamber will heat up too fast bringing with it the risk of carbonization or decomposition by exceeding threshold temperatures.

The same would apply to the heating projection and to the outlet chamber wall in embodiments which have either or both of these features.

Applicants have found that a chamber wall thickness of 12 mm to 40 mm optimises even heat transfer, whether it be of the melt chamber and, where appropriate the outlet chamber.

From another aspect, the present invention consists in an apparatus for treating contaminated plastics waste, said apparatus comprising a melt chamber having an outlet in its bottom through which molten plastics waste can continuously flow under gravity, said melt chamber being a conductor of heat and being capable of dissipating heat in a controlled manner. In effect the melt chamber operates as a heat sink.

To facilitate heat conduction and in order to maintain the heated plastics waste molten so that it can flow continuously under gravity through the outlet, heating of the plastics waste in the outlet region may be provided by means of the heated projection mentioned previously. Such a projection may be in the form of a spider which conveniently forms part of, is fixed to, or is integral with the wall of an exit zone which defines an outlet chamber. Such an outlet chamber provides the melt with a sufficient dwell time to permit sterilisation of any organic material such as food and thereby minimize the risk of any bacterial growth which would be of particular importance on board ship for example, as there is a need for solidified product containing contaminants to be stored on board ship for at least 45 days or more depending upon how long the ship has to be at sea. Basically the outlet chamber provides the melt chamber with an extended heating zone.

In one embodiment of outlet chamber constructed in accordance with the invention, the continuous flow through the outlet is interrupted by a valving system, eg a plate valve, once the outlet chamber has been provided with a charge of molten plastics waste, and is allowed to flow out of the outlet chamber when a similar valving system is opened.

By heating the outlet chamber in the region of the melt chamber outlet, ie upstream of the final discharge location from the outlet chamber, continuous flow of the molten plastics waste into the outlet chamber is ensured.

The configuration of the melt chamber may be of any suitable form consistent with contributing to the achievement of optimum heat transfer conditions and to the maintenance of an even heat profile. Thus the inner surface of the melt chamber wall is ideally of circular cross-section and desirably tapers towards the chamber outlet to facilitate flow. In one embodiment, the melt chamber may have a tubular or cylindrical portion leading into a conical or tapering portion or the melt chamber may taper eg be conical all the way from inlet to outlet. Such a construction can be of particular use for the treatment of plastics cups from vending machines with for example the cross-section in the upstream region of the melt chamber matching that of larger or the largest cups and that of the downstream region matching that of smaller or the smallest cups.

Therefore in accordance with another aspect of the invention the melt chamber has a cross-section which corresponds to that of the articles to be treated.

In another embodiment the melt chamber can be of generally spherical shape or even oval in cross section to increase the surface area available to transfer heat from the heated chamber wall to the plastics waste. Whilst it is possible for the chamber to be polygonal in cross-section, eg triangular, rectangular, octagonal etc etc, and may even be desirable, cross-sections which are of continuous annular form, ie with only one side, such as circular, oval, etc are preferred for ease of construction and to maximize heat transfer.

Moreover, at least the lower portion of the chamber preferably defines an open volume free of any vanes, baffles, fins or other obstructions projecting from the chamber wall which facilitates downwards movement of the contaminated plastics material and flow of the molten plastics material through the chamber outlet. And, in apparatus constructed in accordance with the invention, there is no need to arrange for the flow of molten plastics material to have assistance or drive of any mechanical means, the controlled heating and size of melt chamber outlet being sufficient to ensure continuous flow of molten plastics through the outlet.

From yet another aspect the present invention consists in apparatus for treating contaminated waste, comprising a melt chamber having an outlet of large cross-sectional area in its bottom and being shaped and constructed to optimize heat transfer and to facilitate a continuous gravitational flow of molten plastics through the outlet.

It is desirable in order further to facilitate flow in particular in cases where the wall of the melt chamber and any outlet chamber is made of a high conductivity material having a relatively course grain structure, which may be the case if the wall is cast eg of aluminium, to provide the inner surface of the melt chamber and any outlet chamber with a coating of a polymeric material such as polytetrafluoroethylene (PTFE) of which TEFLON (Trade Mark) is one example. The surfaces of the high conductivity material when of nonferrous metal are advantageously machined before coating with the polymeric material such as PTFE.

The thickness of the polymeric coating must be consistent with obtaining the desired "non-stick" properties without affecting heat transfer and the useful life of the melt chamber by wearing through the coating eg by abrasion from hard contaminants. Applicants have found that a coating of high temperature PTFE of 75 microns thickness works well in the practice of this invention but thicknesses in the range of 50 to 100 microns can be used.

So as to reduce heat losses and energy requirements from the melt chamber and to assist in maintaining the requisite heat transfer and even heat profile, and to maintain the external surface of the melt chamber below E.E.C health and safety maximums, the melt chamber may be provided with an external wrap-around layer of insulating material which is preferably of jacket form. One form of jacket may be 25 mm thick, contain a suitable ceramic and have a quick release facility such as velcro fasters which may be of stainless steel. Such insulation can be up to 75% efficient eg the internal temperature would be 200° C. dropping to an external temperature of 50° C.

Solidification of the molten plastics material flowing continuously through the chamber outlet or any extension thereof may be achieved in a number of ways.

For example the valved outlet chamber may be provided with cooling means in the downstream region thereof so that when the molten material has cooled in this downstream region, the downstream valve can be opened to allow the solified body to fall out of the outlet chamber under the influence of gravity.

The cooling means is, advantageously, a liquid which is caused to flow continuously in passages, bores or tubes, for example by means of the pump and constitutes a closed circuit. To facilitate cooling, the coolant flow passages are conveniently embedded in the wall of the outlet chamber, as by casting so as to be integral therewith. In such a case the outlet chamber wall will also be cast and the coolant passages be located nearer the inner surface of the outlet chamber than the outer surface to enhance the cooling effect.

However, to facilitate operation and increase speed, the outlet chamber preferably comprises more than one solidification cavity which constitutes a moulding zone downstream of the exit zone. Such a plurality of mould cavities are movable either manually or automatically into and out of alignment with the exit zone and are cooled as by a coolant liquid flow when out of alignment with the exit zone. When the plastics material in a mould cavity has been sufficiently cooled, that mould cavity can be moved to a discharge position in which a solidified body of densified plastics waste is ejected from the mould cavity.

Shrinkage brought about by cooling can assist in such ejection which can be further assisted by the aid of gravity alone or by the use of suitable hydraulic, electrical or mechanical means. However, for simplicity of construction, cost effectiveness and ease of operation, the or each mould cavity is preferably shaped to permit a solidified body to fall under the influence of gravity alone.

Thus the or each mould cavity may be of inwardly tapering form. The angle of the taper is advantageously sufficiently off being a right angle to permit automatic ejection under gravity once sufficient cooling, and thus shrinkage, has taken place and the mould cavity has been moved to an ejection position. The angle of taper may be in the range of about 50° to about 85° and specifically and preferably a combination of tapers in which the taper is accentuated on the narrower leading edge.

Ideally, the or each mould cavity is also provided with a polymeric coating of say PTFE in the same or a similar way to melt chamber and any outlet chamber.

Such a construction of mould cavity may also be used in apparatus having only one mould cavity.

In a preferred embodiment of the invention, the ejection opening of the mould cavity is closed by a cooperating member so that molten plastics is prevented from flowing out of the mold cavity during filling and during cooling. Preferably, the cooperating member is fixed in relation to the mould cavities and may be heated in the filling position and cooled in the cooling position, conveniently by a liquid coolant to enhance filling and cooling as the case may be.

Cooling ducts or passages and optionally electrical resistance heating elements are advantageously embedded in the cooperating member, as by casting. The coolant ducts or passages can alternatively be drilled in the cooperating member. Ideally, the coolant passage and optional heating elements are of looped configuration to enhance cooling/heating.

In order not to lose too much heat from the exit zone or outlet area to preserve continuous flow, it is desirable to isolate cooling from heating by means of a thermal break which can be provided between adjacent mould cavities and optionally between the cooled and heated sections of the cooperating member if the heating is also provided therein.

The mould cavities may be defined in a support member such as a plate which is rotatable or reciprocable in a generally horizontal plane or alternatively in a support member which is rotatable about a generally horizontal axis. In the latter construction the entry opening in the or each mould cavity also becomes the exit opening for discharge of a solidified body of waste plastics.

The support member and any cooperating member will advantageously be made from a similar or the same high conductivity material as that of the melt chamber and any outlet chamber.

The movement of the mould cavity support actually severs the plastics in the mould cavity from the plastics flowing through the exit zone.

In another embodiment, the molten plastics emerging in a continuous flow from the chamber outlet may be cooled as by a liquid spray. Means such as a knife or knives may be provided for severing the solidified plastics from the molten plastics emerging from the outlet. Whatever solidification apparatus is used, the shape of the outlet chamber or chambers and mould cavity or cavities or of the melt chamber outlet is such that solidified products or bodies of plastics material are obtained which are shaped and can be stacked. Thus, the solidified bodies may be of block form like bricks or briquettes.

The heating elements may be of any suitable form but preferably are tubular heating elements having a minerally insulated resistance heating coil compacted and held therein by the insulation which may be magnesium oxide.

As has been previously mentioned gravity is the preferred agent for ejection and in such a case, the apparatus may include means eg a stationary receiving means such as a receptacle, plate or tray disposed beneath the melt chamber and solidification zone for receiving the solidified bodies.

Conveniently, holding means such as an electronic lock is provided to prevent access to the collection means until the solidified bodies have cooled to an acceptable level. In such a case a visual and/or audible indicating means may be provided to indicate when the temperature has fallen to the acceptable level. Although generally speaking, cooling in the solidification or moulding zones will be such as to provide a cooler outer skin which insulates the hotter interior of the solidified bodies sufficiently to avoid any damage to an operators hand.

Alternatively, the receiving means may be a chute or a moveable member such as a conveyor for removing the solidifed bodies from beneath the solidification or cooling zone. In such an embodiment the holding means such as an electronic lock is optional.

So as to ensure that the flow of molten plastics from the exit zone is not interrupted, means such as a vent opening may be provided for allowing the egress of air from the or each molding cavity.

In a preferred embodiment of the invention, the entry region of the or each mould cavity is of slightly different size, eg larger in size than that of the outlet from the melt chamber or outlet chamber so as to provide at least one aperture for the egress of venting air.

Accordingly, from another aspect the present invention consists in apparatus for treating contaminated plastics waste, said apparatus comprising a chamber for heating contaminated plastics waste so as to melt the plastics waste, means defining an outlet in the bottom of said chamber through which contaminated molten plastics material can flow in an uninterrupted manner, means for solidifying the molten plastics emerging from the chamber outlet, said solidifying means comprising at least one cavity and means for permitting the egress of air from the or each mould cavity.

To meet safety requirements, it is desirable that the melt chamber comprises a vent or other outlet, preferably in an upper portion thereof for exhausting any odours eg fumes, and any other fumes which might conceivably be given off during melting of the plastics waste. For example organic material in medical waste may give rise to fumes. And it is preferable that such a vent or exhaust outlet be provided with a suitable filtration system or filters such as zeolite panels as above referred to, activated carbon filters or electrostatic filters or any other suitable filtration means. Moreover, it may be useful to have assisted extraction of such odours, fumes or gases utilizing a fan or any other suitable means. By having such filtration means, venting will not interfere with the environment nor, when the apparatus is installed upon a ship, with the ship's venting system.

Apparatus constructed in accordance with the invention can readily incorporate many other safety features.

Access to the internal mechanism and melt chamber may be restricted to key-holding authorised personnel and desirably is also restricted by means such as an electronic timer until the melt chamber has cooled to an acceptable level.

Operator controls are conveniently restricted to an on/off button but 'off' function is preferably over-ridden by an electronic timer with a logic output controlling the electrical circuitry and solidifed body receiving means.

In another embodiment, the melt chamber is controlled by an intelligent 'EPROM' (programmable silicon chip) assisted temperature controller which monitors the temperature of the melt chamber by a thermocouple. If the temperature exceeds the set threshold value for a particular plastics waste or mixture or predetermined maximum temperature, the temperature controller de-activates the heating elements.

In order to respond to any possibility of thermocouple failure, the temperature controller may also de-activate the heating elements. The temperature controller may be a factory set P-C-B (printed circuit board) which is encapsulated into a phenolic (very hard) resin 'pot' to restrict unauthorised adjustment. In the event of the temperature controller malfunctioning, any increase in temperature over the safe limit may be protected by a secondary safety circuit. This conveniently may be a mechanical surface mounted thermostat which is attached to the outer wall of the melt chamber. In the event of a temperature 'overshoot' or overload caused by any reason, such a thermostat would isolate all electrical circuitry from the mains input supply.

Any deviation from normal operation may be indicated by any suitable indicating means such as a red L-E-D bulb on say a control panel.

As the operating temperature is set to be below the carbonization or flashpoint and/or decomposition point of the plastics waste that enters the apparatus, fire is an unlikely hazard. However, to avoid this possibility the melt chamber melt entry chute and shelf are advantageously manufactured from metal which is non combustible. As the melt chamber can be a sealed environment it would be unlikely that there would be sufficient oxygen present to sustain combustion. However, a fire extinguisher circuit may be included so as to operate automatically if all other procedures on the apparatus failed and fire did occur. A fire extinguisher nozzle valve or similar orifice may be included.

Apparatus constructed in accordance with the invention is particularly suitable for treating contaminated plastics waste which has a volume content of at least 80% EPS. Contaminants such as uneaten food, paper tissues or other organic material are encapsulated into the melt deposit and are partially size reduced by desiccation.

As EPS has a high volume to low weight ratio the ingress of obviously unacceptable contaminants such as house bricks, glass bottles etc may be restricted by supporting the entry shelf on weight sensitive gimbals. If the weight entry is too high, indicating such a contaminant, the entry support drops into a gimbal cam and lock to prevent rotation.

The melt chamber, any outlet chamber and solidification means may be conveniently housed within a suitable cabinet or casing which preferably is provided with a suitable control panel and ideally all parts may be easily dismantled or in kit form to enable freedom of access through confined spaces.

The invention envisages at least the following units (a) a small compact apparatus for the consumer market such as fast food outlets which may be as little as five feet in height and occupy a ground area which is around four foot square or even smaller when the apparatus is incorporated in a vending machine or used for the treatment of credit cards for example; b) a medium sized apparatus for industrial uses and (c) an even larger apparatus for the treatment of private and municiple plastics waste.

The cabinet of the compact unit may be designed such that it has the appearance of say of a large vending machine or ice dispenser so that it can readily merge into the particular environment without being so obvious as to cause an eyesore or otherwise interfere therewith. As no hydraulic rams are being used, the footprint area is considerably smaller than would otherwise be possible.

The upper half of the apparatus may include a hopper with a door or doors which may be hinged for manual loading into the melt chamber and may be provided with a separate removable back panel to give access for future automatic loading into the melt chamber. Such a hopper is advantageously of stainless steel.

Apparatus constructed in accordance with the invention may constitute what is, in effect, an electric dustbin which can be kept running continuously without needing ever to be turned off and which moreover, in some instances, eg in the vending machine, fast food and credit card applications is capable of being plugged into a 15 Amp electrical mains supply in the UK or equivalent mains supply in other countries such as the U.S.A. or Canada, ie that mains supply used for the domestic supply of electricity.

From yet another aspect the invention consists in a solidified body of contaminated plastics waste produced from any of the methods or by any of the apparatus defined hereinabove.

BRIEF DESCRIPTION OF THE DRAWINGS

The foregoing summary of the invention, as well as the following detailed description of preferred embodiments, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed.

FIG. 2 is a perspective view of a housing forming part of another embodiment of the invention, for commercial use;

FIG. 3 is a perspective view of a housing forming part of another embodiment of the invention, for industrial use;

FIG. 6 is a vertical section taken along the line VI—VI of FIG. 5;

FIG. 7 is a partial section of an electrical resistance heating element used in the apparatus of FIGS. 4 to 6;

FIG. 9 is a plan view taken generally along the line IX—IX of FIG. 5 and looking in the direction of the illustrated arrows;

FIG. 10 is a plan view of a reciprocatable moulding member;

FIG. 11 is an end view and FIG. 12 is a cross-section of the reciprocatable moulding member shown in FIG. 10;

FIG. 14 is a side elevation of an alternative apparatus to that of FIGS. 1 to 12 and with a different housing shown in chain lines;

FIGS. 23 is a part perspective view from the front and one side of a vending machine incorporating a modification of the apparatus shown in FIGS. 4 to 12, for the treatment of used plastics dispensing cups;

FIG. 24 is a vertical section through that part of the vending machine of FIG. 23 containing the modified used plastics cup treatment apparatus;

FIG. 25 and 26 are sectional detail views of modified plastics cup treatment apparatus;

FIG. 30 is a diagrammatic perspective view of a further modification for use in treating expired or damaged cash or credit cards;

DESCRIPTION OF THE PREFERRED EMBODIMENTS

Figure 1:
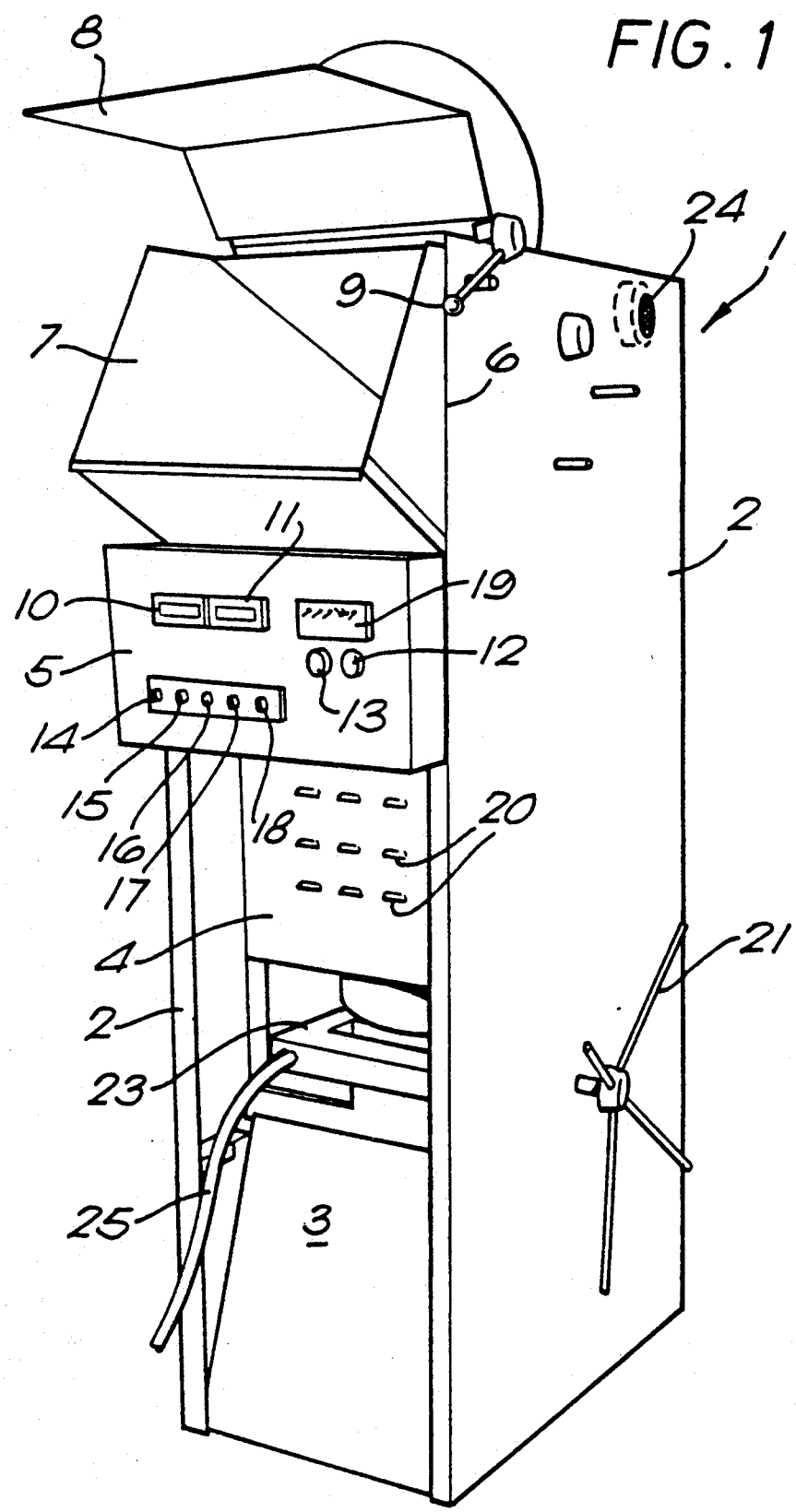
FIG. 1 is a perspective view of a housing forming part of one embodiment of an apparatus for treating contaminated plastics waste, for commercial use, and constructed in accordance with the invention.

In the drawings the same reference characters are used to designate the same or similar parts.

Referring to FIG. 1 there is shown a housing in the form of a cabinet which is generally indicated at 1 and which comprises side panels, 2 front panels 3,4 and 5, a top panel (not visible) and at least one rear panel (not visible). Within the cabinet 1 is a chassis to which the cabinet panels are fixed and which supports the main operating components of the apparatus to be described. The cabinet has an opening 6 at in its upper front region through which a loading hopper or entry chute 7 for directing contaminated waste plastics, such as any of those described in the foregoing, into a densification or melt chamber to be described for treatment. The loading hopper 7 which is preferably of metal such as stainless steel, which is non-combustible has a door 8 which is hinged to the top panel and which is opened and closed manually by a handle 9.

The front panel 5 of the cabinet 1 constitutes a control panel which carries various electrical control elements such as temperature gauges 10,11 switches 12,13 indicating lights 14,15,16,17 and 18 and six fused circuit breakers 19 all of which are connected in an electrical control circuit which is not shown as it does not in itself form part of this invention. The circuit breakers 19 are provided for each individual part of the electrical control circuit. And, if desired the operations effected through the electrical control circuit may be controlled by a suitable PLC (Programmable Logic Controller) disposed behind the control panel 5. Apertures 20 are provided in the front panel 4 which acts as an air inlet or ventilation grill 20.

A rotatable operating handle 21 for manually indexing a mould cavity support member 23 to be described is supported in the side panel 2 and chassis for rotation with respect thereto.

In order to remove any odours, fumes or other gases which may be produced from the treatment process, a venting or exhaust port 24 is provided in the side panel 2 and is connected to a suitable filtration system and to a fan which are not shown. The door 8 seals the loading hopper 7 and the melt chamber to prevent any gases from escaping other than through the port 24. Liquid coolant is supplied by a pump (not shown) in a closed circuit through ducts such as 25 to the mould cavity support member 23.

The cabinet shown in FIG. 2 differs from that shown in FIG. 1 in its aesthetic appearance, in the position of the air inlet 20, in the kind of door which is a flexible articulated door 8a, in the position of the control panel 5 and in the provision of an electronic display (not shown) on the bevelled portion 26 at the top of the cabinet. The air inlet 20 is at the bottom of the panel 3 instead of being in the panel 4 which is omitted in this embodiment. The door 8a comprises articulated slats which, in the vertical closed position illustrated, seals the cabinet. When the door 8a is opened by pulling down, the door forms a shelf for receiving the plastics waste. The action of closing the door to the vertical position retracts the shelf, causing the waste to fall into the hopper.

The cabinet 1 illustrated in FIG. 3, has two sideways opening doors 8b and a handle 27 for locking the doors 8b in a sealed position and for releasing the doors for opening. In both these embodiments of FIGS. 2 and 3 the doors are a flush fit with the cabinet front panels.

Referring now to FIGS. 4 to 12, the loading hopper 7 has an upper tapering portion 30 and a lower cylindrical portion 31 which fits on the upper cylindrical portion 32 of a densification or melt chamber 33 for receiving and heating contaminated plastics waste such as used EPS cups, trays and clamshell containers of the kind supplied with food in fast food restaurants for example. As will be appreciated from FIG. 6, the top edge region 34 projects into a recess formed by a shoulder 35 which rests on the upper edge of the upper cylindrical portion 32 and by a peripheral restraining flange 36 which provides for ease of assembly.

The longer cylindrical portion 32 which is of larger diameter merges into a frusto-conical portion 37 which tapers in the direction of, and merges into, a smaller diameter cylindrical portion 38 the junction of which with the frusto-conical portion 37 defines an outlet 39 in the bottom of the melt chamber 33 and constitutes an extended outlet chamber or exit zone 40. The outlet chamber or exit zone 40 can be further extended by means of a post-densification or melt chamber 29 which comprises another cylindrical portion 41 which is of the same internal diameter as that of the cylindrical portion 38 of the melt chamber. By means of respective peripheral flanges 42 and 43 and bolts (not shown) passing through holes 44 and 45, the cylindrical portions 38 and 41 can be securely and sealingly fixed together with their inner surfaces in alignment as will be more readily apparent from FIG. 6.

The cylindrical portion 41 carries an integral projection 46 which extends upwardly through the hollow interior of the cylindrical portion 41 and into the cylindrical portion 38 where it projects into the melt chamber outlet 39. As can be seen from FIGS. 5 and 9 the projection constitutes a central web which extends across the cylindrical portion 41 to split the exit zone into two generally D-shaped outlets 47. Thus the web-like projection 46 may loosely be called a spider. In order to enable the spider 46 to be inserted into the cylindrical portion 38 of the melt chamber 33, the spider has an upper portion 48 which is of lesser width than its lower portion to provide a clearance 49 between the projection and the inner surface of the cylindrical portion 38. The clearance 49 also exists between the upper part of the cylindrical portion 41 and the spider 46.

Both densificiation and post-densificiation chambers 33 and 29 are of heavy duty cast aluminum to optimize heat transfer by conductivity and radiation and are provided with integrally cast-in electrical resistance tubular heating elements 50 and 51 respectively. Moreover, all working surfaces of both chambers 33 and 29 and of the spider 46 are machined and provided with high temperature polymeric coatings of PTFE having respective thicknesses of about 75 microns and 50 microns. To further optimize on heat transfer the electrical heating elements are located in specific zones and are arranged in a particular manner. As can be seen from FIG. 6, in the illustrated embodiment, in an entry zone 52 of the densification chamber 33 the electrical heating element or elements is/are more widely spaced apart than in an intermediate zone 53 and exit zone 54 of the densification chamber 33 in which the electrical heating elements 50 are more closely spaced together and in a final or extended exit zone 55.

The electrical heating element 51 comprises spirally or helically wound turns which are also relatively closely spaced together and whose ends are connected to the electrical control circuit. All the heating elements 50 and 51 are located closer to the inner surfaces of the cast cylindrical wall portions 38 and 41 of the densification chamber 33 and post-densification chamber 29 than to the outer surfaces of these wall portions, again to maximise heat transfer into the interiors of the two chambers. As can be seen from FIGS. 8a and 8b, the heating elements which are in the wall portions 32,37 and 38 of the densification chamber 33 of FIGS. 4 to 6 comprise a plurality of loops 50a which extend from electrical connections 50b, at the open ends of the loops, to the electrical control circuit, like fingers around the chamber 33 to terminate with the closed ends 50c of the loops adjacent each other to minimize the risk of any "cold" spots. The loops 50a extend circumferentially of the chamber 33 in parallel with one another.

The spider 46 is also provided with an integrally cast-in electrical resistance tubular heating element 56 which is arranged in the form of two loops 56a which extend in the transverse direction of the spider as will be apparent from FIG. 6. The ends of the looped heating element 56 are, again, connected to the electrical control circuit. By means of the heated spider, heat is brought to the middle or central region of the post-densification chamber 29 and of the outlet region of the densification chamber 33.

Referring to FIG. 7, each electrical resistance heating element 50,51 and 56 is a tubular sheathed element and comprises a conductive metal outer tube 140 and an inner axially extending spiral resistance wire 141 eg of Nickel Chrome with an insulating packing material 142 such as magnesium oxide powder between the wire and the tube. The insulating powder is compressed by reducing the diameter of the tube after assembly.

In order to be able to sense the temperature of melted plastics within the chambers 33 and 29, the chamber walls are provided with thermocouple type melt probe access points (not shown) which are spaced from each other, through which temperature sensing probes (not shown) project into the chambers. Two preferred locations are near the outlet 39 of the densification chamber 33 and in the region of the outlets 47 of the post-densification chamber 29. Such probes would be connected to the temperature gauges such as 10 and 11 in FIG. 1 through the electrical control circuit and because of their spacing provide a useful temperature differential to facilitate efficient operation.

Figure 4:
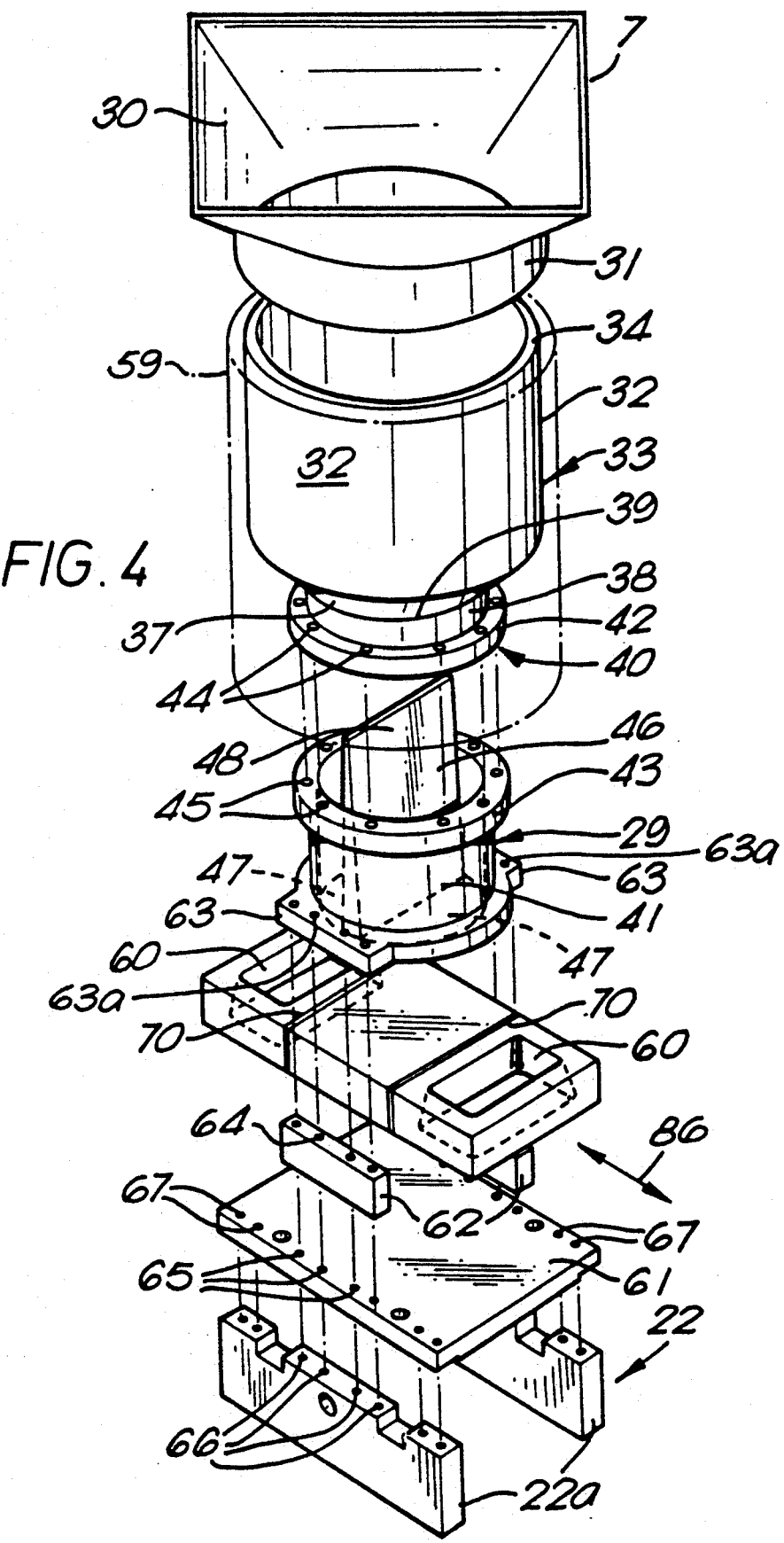
FIG. 4 is an exploded perspective view including the main operating components which are mounted within the housing shown in any of FIGS. 1 to 3.

An insulating jacket 59 surrounds the densification chamber 33 and most of the post-densification chamber 29, as shown in chain lines in FIGS. 4 and 6.

Beneath the outlets 47 a solidification or moulding zone is provided by a generally horizontally reciprocable mould cavity support member in the form of the mould plate 23 defining two upwardly tapering or downwardly diverging mould cavities 60. The mould plate 60 slides upon a base plate 61 and is guided for reciprocating movement in the direction of the illustrated arrow heads (FIG. 4) between three indexed positions by guide blocks 62. These guide blocks 62 are fixed to the base plate 61 and to respective peripheral flanges 63 which are integral with the cylindrical portion 41 of the post-densification chamber 29 as by bolts (not shown) passing through respective holes 63a,64 and 65 in the flanges 63, the guide blocks 62 and base plate 61 and into threaded bores 66 in the side members 22a of the chassis 22. Further holes 67 and threaded bores are provided in the base plate 61 and chassis members 22a for bolts (not shown) to provide additional fixing. Thus the whole assembly of the chambers 29,33 and load hopper 7 are securely supported on the chassis 22 through the guide blocks 62 base plate 61.

The dual cavity mould 23 is made in three parts which are of aluminium or of another suitable metal such as stainless steel and which have thermal breaks 70 of a suitable temperature resistant material therebetween. The outer two parts contain the mould cavities 60 and the central part 71 is solid to act as an obturator or slide valve in a manner to be described. Both the upper and lower working surfaces of the mould plate 23 are planar to cooperate respectively with the lower and upper planar working surfaces of the cylindrical portion 41 of the post-densification chamber 29 and of the base plate 61. To facilitate sliding movement of the mould plate 23, and to guard against wear, its upper and lower working surfaces and the lower surface of the cylindrical portion 41 and the side surfaces of the mould plate and cooperating side surfaces of the guide blocks 62 are fully machined and coated with a suitable high temperature high lubricating compound such as PTFE to a thickness of say 25 microns. In a similar manner the upper surface of the base plate 61 is fully machined and coated to say 75 microns with high temperature PTFE.

Referring now to FIGS. 10 to 12, it can be seen that the three parts of the mould plate 23 are fixed together as by bolts 72 passing through holes in the central part 71 and thermal breaks 70 and into threaded bores in those parts defining the mould cavities 60. In order to preserve the integrity of the thermal breaks, either the threaded shafts of the bolts 72 or threaded bores are provided with a coating of non-conductive material, or the threaded bolts are made of a non-conductive material.

Each mould cavity part of the mould plate 23 is provided with its own closed cooling circuit containing a liquid coolant and comprises a duct 25 having a respective loop 74 which is shown in chain lines in FIG. 10 and which extends around the relevant mould cavity 60 and is embedded in or integral with the particular mould cavity part. If the plate 23 is cast, the coolant duct loops 74 are integrally cast-in during casting. Each duct 73 is connected to a pump and heat exchanger both of which are not shown for reasons of clarity.

FIGS. 10 to 12 also show the downwardly diverging or upwardly tapering or converging side walls 75 and end walls 76 of the mould cavities 60 which are preferably coated with a polymeric coating of high temperature PTFE to a thickness of say 50 microns. The side (long) walls 75 have a taper angle of 75° and the end (short) walls 76 have a taper angle of 78°.

The mould base plate 61 also has two closed cooling circuits comprising respective ducts 80 connected to respective pumps and heat exchangers also not shown. In the end regions 81 of the base plate, the ducts 80 comprise a plurality of loops 82 which are embedded therein as by casting if the base plate is cast to be integrally cast-in therewith. On the other hand, the central region 83 of the base plate 61 is provided with electrical resistance tubular heating elements 84 like the heating elements 50,51 and 56 and arranged in the form of curved loops 84 which in the plan view of FIG. 9, are symmetrically disposed about the spider 46 to be beneath the outlets 47, of the post-densification chamber 29. Obviously, the electrical heating elements as well as the coolant circuit pumps will be connected into the electrical control circuit. Also, thermal breaks (not shown) would be provided in the base plate 61 between the heating loops 84 and cooling loops 82.

Preferably, each coolant duct should be made of a material which has a similar coefficient of expansion to the base metal of the mould plate or base plate.

Figure 5:
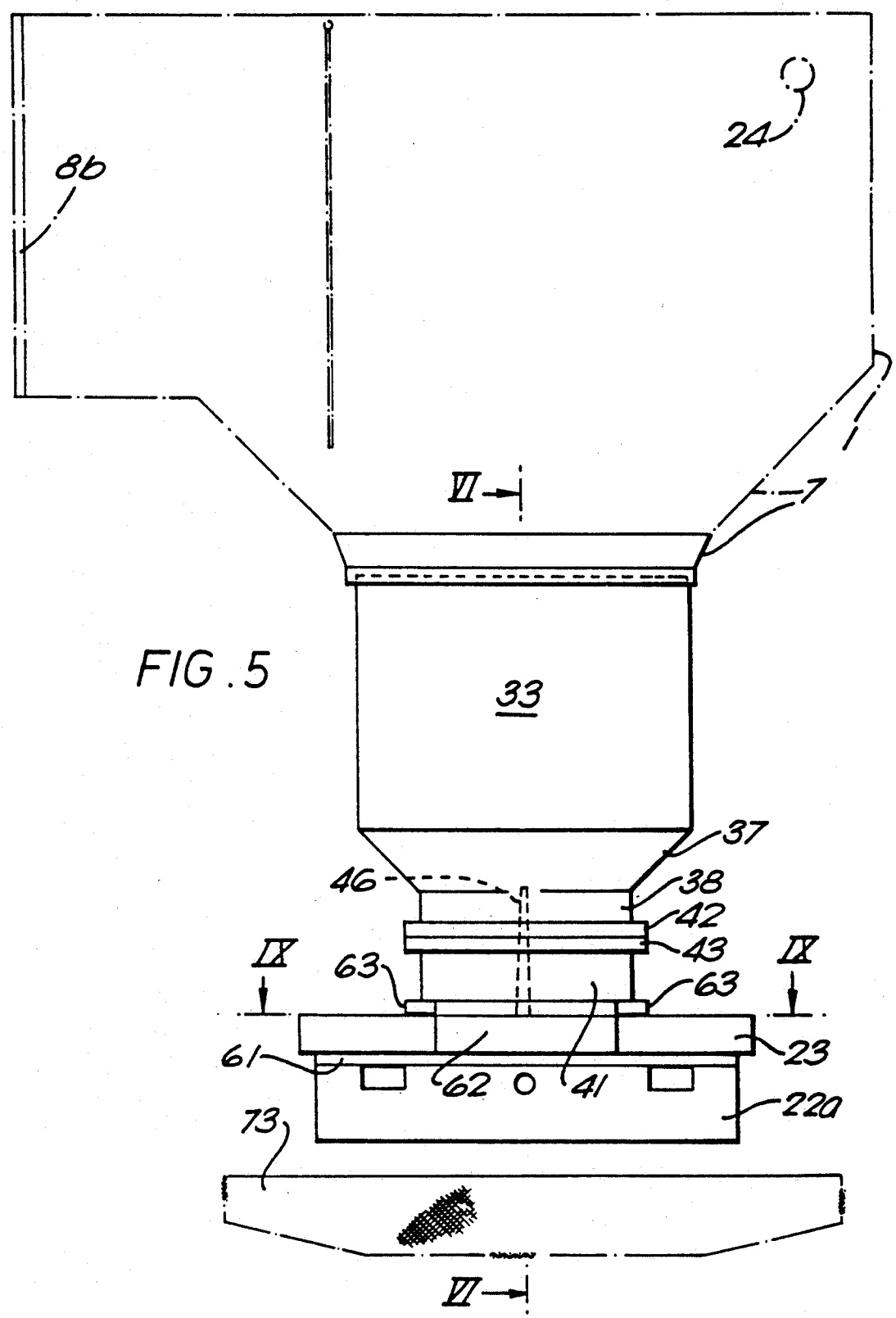
FIG. 5 is a side elevation of the components illustrated in FIG. 4 in an assembled condition, and shows an upper part of the housing of FIG. 3 in chain lines.
Figure 8A:
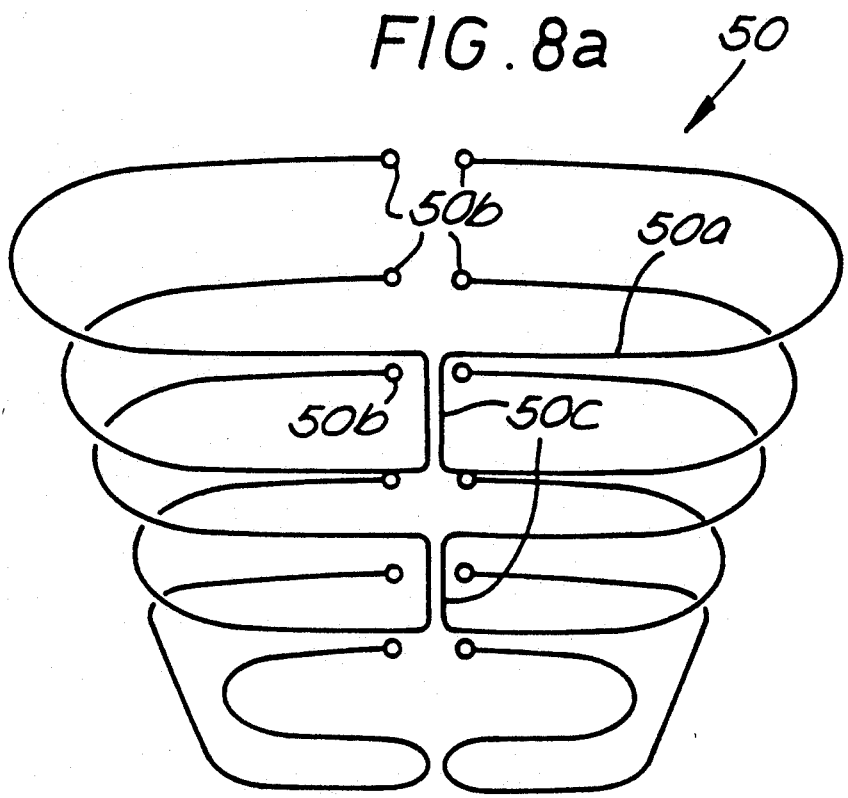
FIGS. 8a and 8b are schematic views showing alternative arrangements of electrical heating elements for the melt chamber illustrated in FIGS. 4 to 6.
Figure 8B:
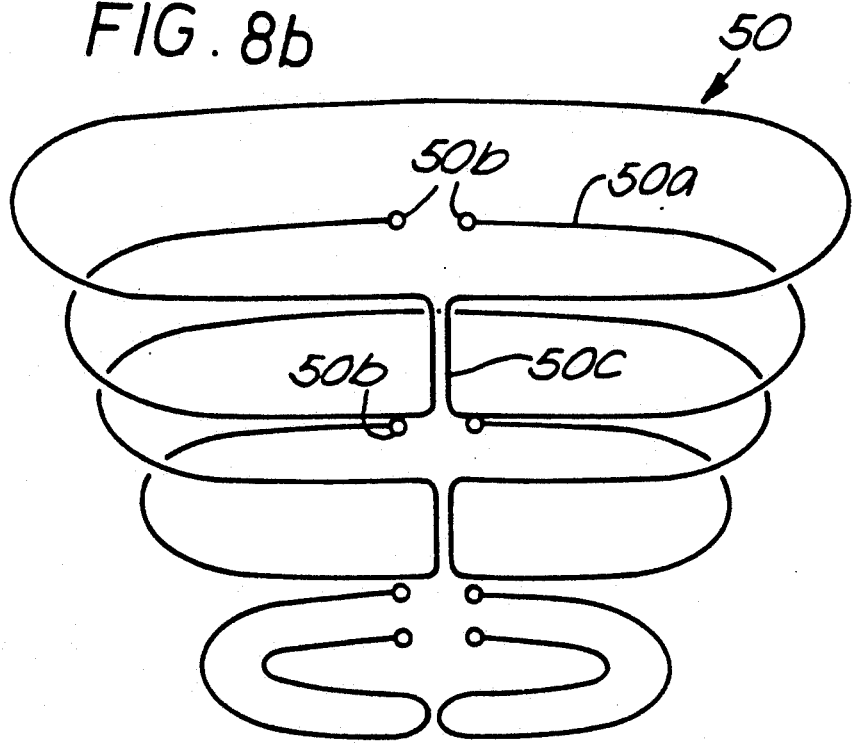

A collection means for receiving solidified plastics waste blocks from the mould cavities 60 is in the form of a tray, 73, FIGS. 5 and 6, is disposed beneath the mould plate and projects sideways therebeyond. Such a collection means will be beneath the mould cavity 60 at the left-hand side as illustrated in FIG. 9 and project beyond the left-hand end as illustrated in FIG. 9 of the base plate 61.

Whenever a mould cavity 60 is in a position in which it is in alignment with either one of the outlets 47 of the post densification chamber 29, vent apertures 85 are uncovered to permit the egress of air from the particular mould cavity 60 and thus from between the mould plate 23 and relevant outlet 47 to ensure that flow of molten plastics waste through the outlet 47 and into the mould cavity is maintained, ie is not interrupted.

Provision is made for the mould plate 23 to be indexed in its reciprocating sliding movement on the base plate 61, in each of the directions indicated by the arrow heads 86 illustrated in FIGS. 4 and 9. To this end, suitable unshown drive means are provided which preferably include a fractional HP reversible geared electric motor which is connected into the electrical control circuit through suitable forward and reverse switches such as 12 and 13 in FIG. 1 for manual override of automatic indexing according to a preset programmed cycle under the control of the PLC. The electric motor conveniently has an output speed of 2 rpm and may be suitable for a relevant mains voltage for the particular country involved, eg 240 volts 1 PH 50 Hz in the UK. A drive shaft which projects from the electric motor runs in appropriate bearings, has two spur gears and a sprocket which meshes with a chain to index the mould plate 23 through a rack and pinion. A slipping clutch and overide facility for manual indexing, eg by the rotatable handle 21 shown in FIG. 1, is advantageously provided in case of need. There are three indexed positions in each direction of movement of the mould plate 23, namely a filling position of a mould cavity, a cooling position of the filled mould cavity and an ejection position for a solidified product formed in that mould cavity.

In this embodiment the control panel has fixed isolator switches for each temperature zone (circuit breakers 19 in FIG. 1) a heat temperature controller, a melt temperature controller, heat burnout protection, apparatus state indicator alarms, and on/off electrical mains isolator switches all of which are connected in the electrical control circuit which comprises hard, ie high temperature resistant wiring.

The apparatus for FIGS. 1 to 12 operates in the following manner for say food contaminated EPS waste comprising clamshell containers, food trays and cups used in fast food restaurants. For such EPS articles, the PLC is programmed to provide a melt temperature which does not exceed 210° C. and is in the range of 170° C. to 210° C. to provide for any increase in temperature required, because of the food contamination, beyond the melt temperature of 170° C. for uncontaminated EPS. Once the required temperatures have been reached the contaminated EPS waste can be fed into the loading hopper 7 from whence it falls under gravity into the open volume defined by the densification chamber 33. The EPS articles rapidly loose their shape and melt until a reservoir of melted EPS is built up in the exit zone defined by the cylindrical portion 38 of the densification chamber 33 and cylindrical portion 41 of the post densification chamber 29.

Thus there is produced a molten column of contaminated plastics material in the exit zone which is maintained in a molten flowable condition by the heating elements in the exit zone, not only peripherally in the walls defining the exit zone but also in the spider 46 and in the mould base plate 61. The reservoir provides sufficient dwell time for any food contaminants to be reduced in size by dessication and fatty substances and liquids to be vapourized and the contaminants to be sterilized. If there are any odours or fumes, these are extracted through the vent port 24 by the fan and rendered harmless by the filtration system. The large cross-sectional area of the exit zone in combination with the heating thereof is sufficient to cause the molten plastics to continuously flow in an ooze-like manner under gravity out of one of the outlets 47 and into one of the mould cavities 60 which has been moved into a filling position by the indexing movement of the mould plate 23, (See the right-hand mould cavity 60 as illustrated in FIG. 9) In this filling position, this mould cavity 60 rests on the base plate 61 above one of the heating loops 84 (FIG. 9) so that the charge of plastics waste oozing into the mould cavity is heated from the bottom to assist flow in the filling position of this outlet 47. The other outlet 47 is closed by the obturating action of the central part 71 of the mould plate. The thermal breaks in the mould plate and the base plate reduce heating losses which otherwise might occur due to the presence of the coolant circuits therein. Moreover, as the mould cavity is filled, air therein is vented through the vents 85 to ensure that there is no interruption in the continuous ooze-like gravitational flow of the column of contaminated molten plastics waste. The large area of the exit zone enables the apparatus to cope with large contaminants eg a whole hamburger which will already be size-reduced by dessication without interrupting the flow.

When the mould cavity has been filled in a time predetermined for the cavity to be filled by programming of the PLC, the mould plate is indexed automatically to the cooling position for that filled mould cavity, the movement of the mould plate causing the molten charge of plastics waste to be severed from the molten column of plastics forming the reservoir in the exit zone. In the cooling position, the filled mould cavity is disposed above the right-hand set as illustrated of cooling loops 82 and the central part 71 of the mould plate 23 obturates flow of molten plastics out of the exit zone through both outlets 47. When the time required for cooling of the charge of plastics waste, governed by the PLC, has passed, which is sufficient for the charge to have solidified at least to the point where a cooler skin of plastics has formed around and there is some shrinkage, the mould plate 23 is indexed to the ejection position in which the mould cavity has cleared the base plate. Then the combination of the shrinkage and the downwardly diverging walls of the mould cavity causes a solidified sterile body in the shape of a stackable briquette 90 (See FIG. 13) to be ejected by gravity from the mould cavity and into the collection means 73. It will be appreciated from FIG. 9 that the ejection position for one mould cavity 60 corresponds to the filling position for the other mould cavity 60.

The relative indexed positions of the mould cavities 60 can be determined by the indicating lights 14 to 18 on the control panel. For example, when either of the outer two lights 14 or 18 is on, a mould cavity is ejecting, when either of the two inner lights 15 or 17 is on, a mould cavity is filling and when the central light 16 is on either of the mould cavities is cooling.

Figure 13:
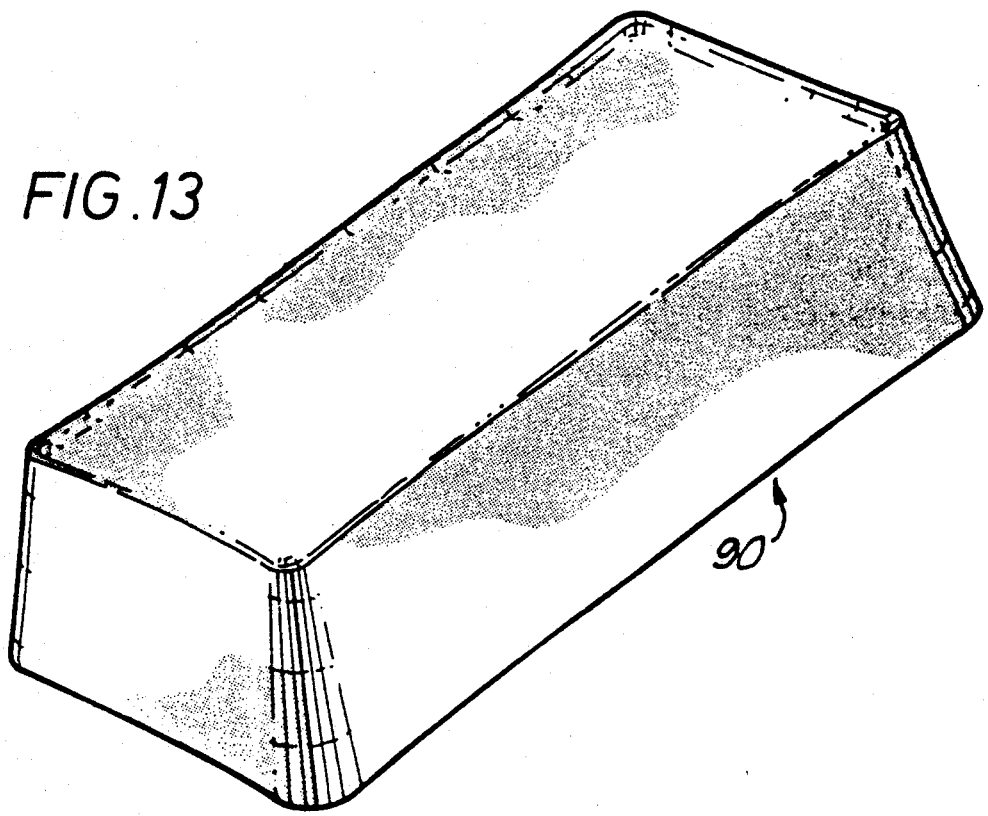
FIG. 13 is a perspective view of a solidified body or product of contaminated plastics waste to an enlarged scale produced by the apparatus illustrated in FIGS. 1 to 12.

The solidified briquette 90 shown in FIG. 13 supports, contains, encapsulates or carries any contaminants therein which have been rendered sterile by the densifying action of the apparatus and can be used for any of the purposes hereinabove referred to.

The embodiment shown in FIG. 14 differs from that illustrated in FIGS. 4 to 12 in that the opening to the loading hopper 7 can be placed, in a loading position, in communication with a rotatable cylindrical shelf or container 91 having an opening 92 through which contaminated waste plastics 93 shown as EPS clamshell containers, cups and a food tray can be placed. Once the waste plastics 93 has been loaded into the container 91, it is turned by hand, as by a handle 94, around its axis to close the loading hopper as well as the cabinet 1 and discharge the EPS plastics waste 93 into the loading hopper 7 from whence it falls under gravity into the densification chamber 33. Such an arrangement prevents direct access into the loading hopper and thus to the densification chamber 33. Moreover, as the container is mounted for rotation on weight sensitive bearings or gimbals such as 95, if any item which is too heavy such as a glass bottle, house brick, small animal or child, which has inadvertently been placed into the container 91 with the plastics waste, these bearings lock up to prevent the container 91 from bearings turned. Thus, the too heavy items can then be removed.

Instead of the reciprocable dual cavity mould plate 61, a circular in cross section mould carrier member 96 which is rotatable about a generally horizontal axis is provided. Such a mould carrier member 96 has four mould cavities 60 therein and is indexable by suitable drive means through filling, cooling, ejecting and empty position as will be apparent from the drawings. Ejection still occurs under gravity but the filling takes place through the wider entry opening through which the solidified plastics briquettes 90 are also ejected by gravity onto a collection tray 97, as the bottoms of the mould cavities 60 are closed. The cooling circuit (not shown) in this instance is located in a curved surrounding cooperating member 98 at the left hand side, as illustrated in the drawings. To assist flow of the molten plastics, additional heating elements (not shown) may be provided in the member 98 where indicated at 99. Moreover, venting apertures (not shown) for allowing the egress of air from the mould cavity 60 so as not to interrupt the flow are provided.

Figure 15:
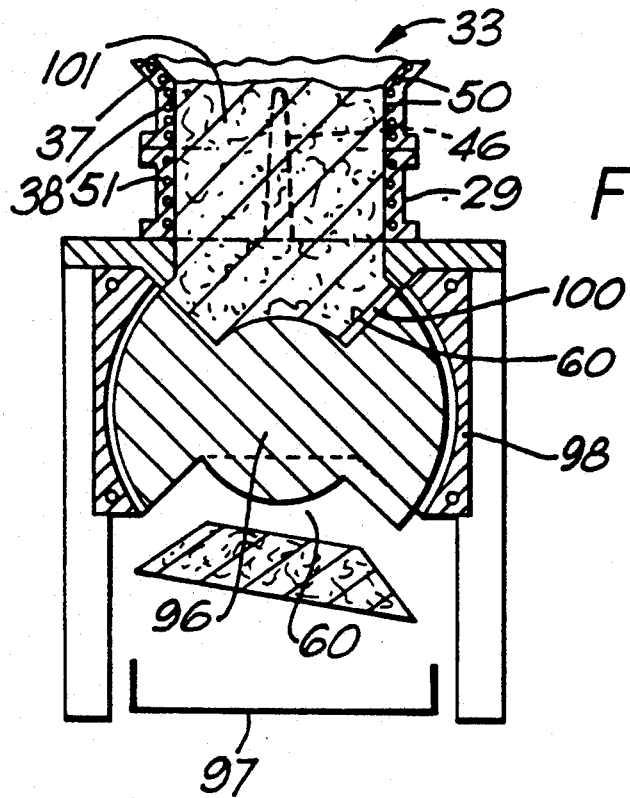
FIGS. 15 to 17 are cross-sectional detail views of modifications of the apparatus shown in FIGS. 4 to 12, with the modification of FIG. 17 being specifically for the treatment of medical plastics waste.

The modification of FIG. 15 has a similar mould cavity and curved cooperating member arrangement to that of FIG. 14 except that there are only two mould cavities 60. Mould cavity venting apertures are indicated at 100. This embodiment clearly shows a reservoir formed by the molten column 101 of waste plastics in the exit zone and the large cross-sectional area or size of the exit zone and its outlet through which molten plastics continuously flows in an ooze-like manner into a mould cavity 60.

Figure 16:
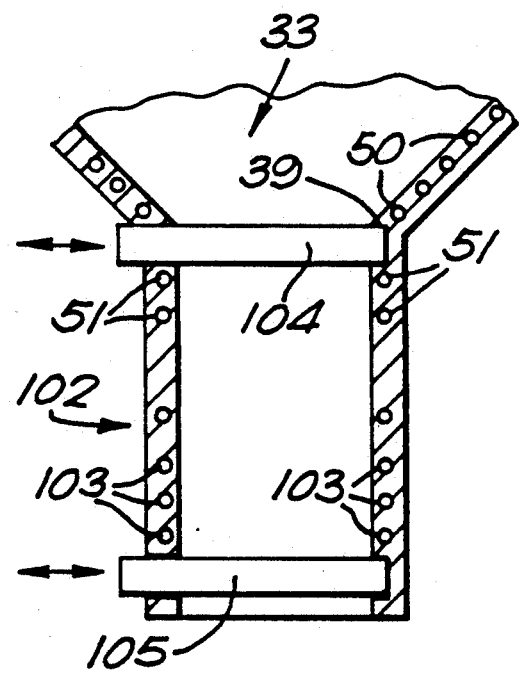

In the modification of FIG. 16, the spider is omitted and instead there is a post-densification or outlet chamber 102 which is of shorter length than those of previous embodiments since heating only takes in the upstream region of the post densification chamber adjacent the outlet 39 thereof. Solidification in this modification is achieved with a cooling duct 103 which is embedded as by casting in a region which extends somewhat from the middle region of the chamber 102 to the downstream end region thereof. Thus the heated exit zone merges into the solidification zone without a break once the chamber 102 has been filled with a charge of molten plastics through the outlet 39 with a slide valve 104 in an open position. This slide valve is closed and then with the slide valve 105 closed at the outlet of the chamber 102, the molten plastics in the column adjacent the cooling ducts 103 is cooled sufficiently to cause some shrinkage of the plastics, the time for which can be preset by the PLC. At this point, both slide valves 103 and 104 are opened so that the solidified portion of the column is pushed out of the chamber 102 by gravity and is replaced by molten plastics whereupon the valve 105 is closed to sever the solidified body from the molten plastics now occupying space adjacent the cooling ducts 103 and the valve 104 is closed. The solidified body which has a cross-sectional shape which corresponds to that of the chamber 102 falls under gravity into a suitable collection means.

Figure 17:
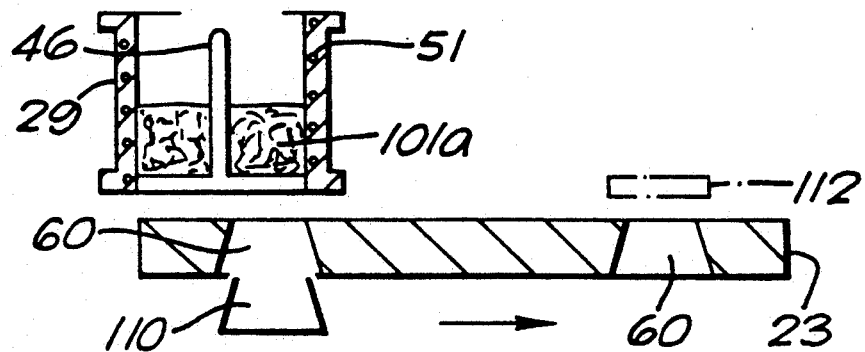
Figure 18:
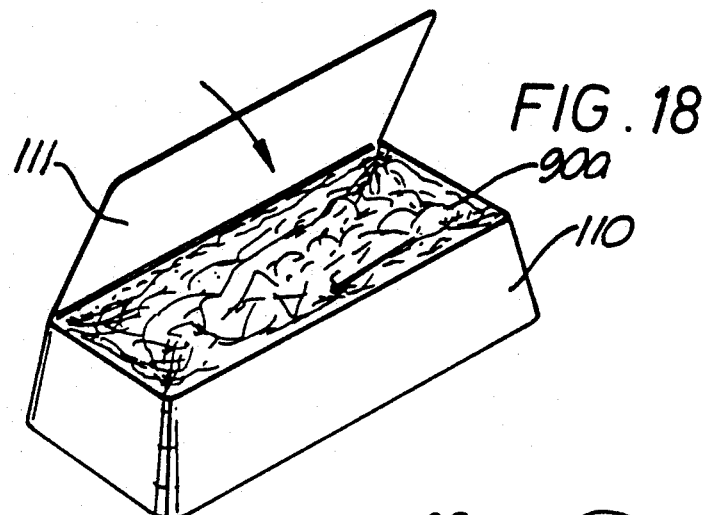
FIGS. 18 to 21 are perspective views to an enlarged scale of different kinds of containers for encapsulating a solidified body of medical plastics waste produced by the apparatus of FIG. 17.
Figure 19:
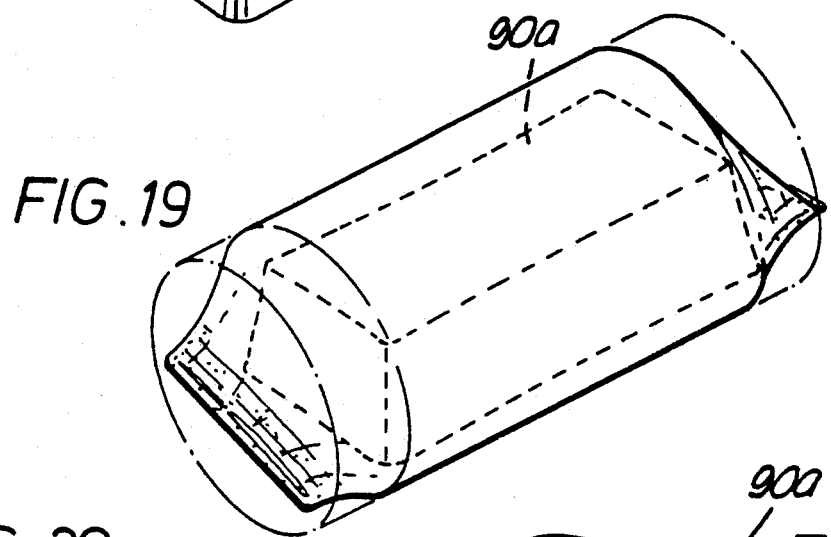
Figure 20:
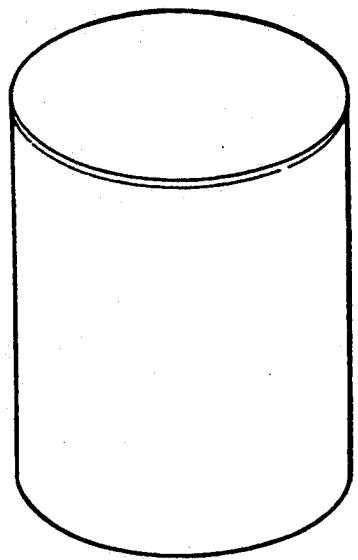
Figure 21:
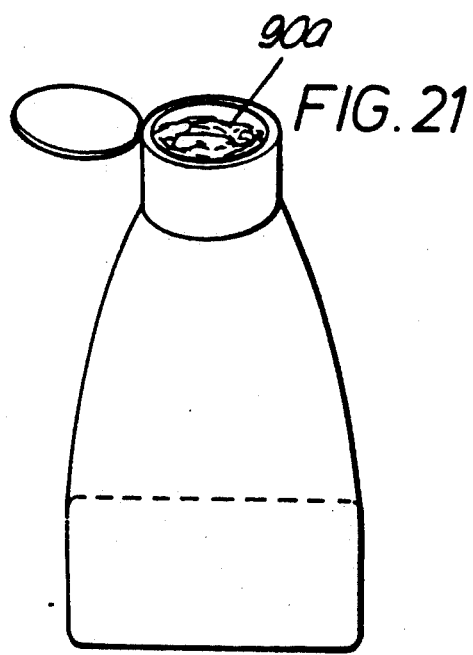

The modification of FIG. 17 has been made to deal with the possible dangers of fluids leaching out of solidified bodies of contaminated medical waste. In such a modification a tough, high temperature outer casing 110 such as that indicated in FIG. 18 could be inserted in the mould cavity to receive a charge of contaminated molten plastics 101a and the lid 111 of the casing be closed by the sliding action of the mould plate 23. Sealing of the lid 111 to the casing could be achieved after cooling and prior to ejection by heat sealing means which is diagrammatically illustrated at 112 in FIG. 17. Other ways of sealing solidified bodies of plastics waste to avoid any dangers of contaminated fluids leaching out are illustrated in FIGS. 19 to 21.

Figure 22:
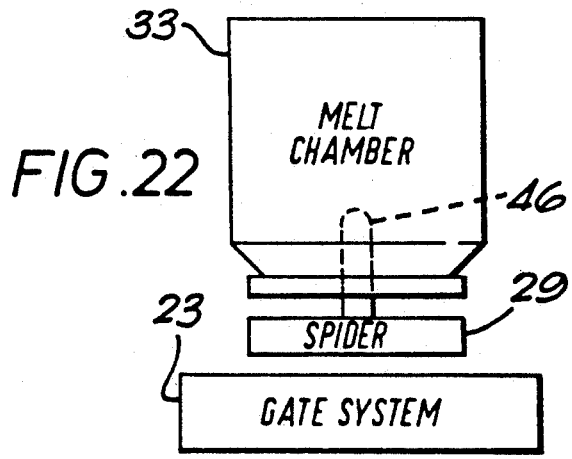
FIG. 22 is a diagrammatic exploded side view of another embodiment of apparatus for treating medical plastics waste.

In another modification for contaminated medical plastics waste, which is illustrated diagrammatically in FIG. 22, a microwave unit 113 is provided for radiating the cooled solidified bodies 90a after they are ejected from the mould cavities in the mould plate 23 and before they fall into the collection tray 97. The microwave unit 113 is connected into the electrical control circuit and the PLC programmed to operate the microwave unit 113 during the fall of each ejected solidified body from its mould cavity. By this means, any potentially dangerous residual fluid or other matter remaining in or on the solidified bodies 90a would be sterilized.

Figure 26:
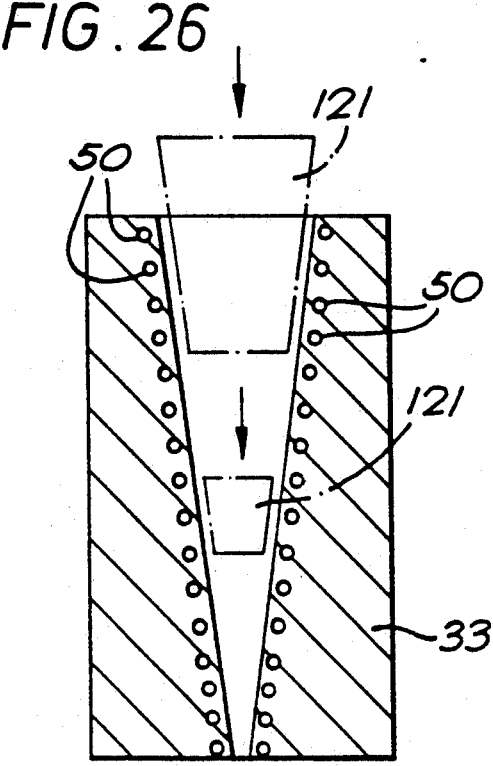
Figure 27:
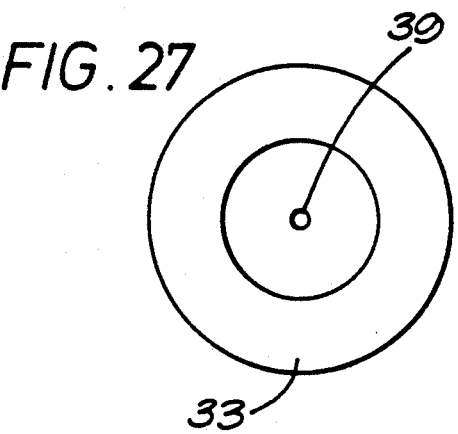
FIG. 27 is plan view of FIG. 26.

Referring now, to FIGS. 23 and 24, there is shown a vending machine 120 which dispenses beverages and other liquids such as soups in plastics cups. Incorporated in the vending machine is another modification of the apparatus described with reference to FIGS. 4 to 12. Because the food contaminants are of small size, such as sugar, soup particles, liquids etc a sufficient dwell time to achieve sterilisation occurs in the densification (melt) chamber 33. Indeed sufficient heating to melt and sterilize the used plastics waste cups 121 may be achieved by providing heating elements 50 only in the region of the chamber outlet 39. Moreover, there is no need in this instance to have a spider to bring heat to the central region of the melt and the outlet or any desired extension thereof. Thus the exit zone can have a much smaller cross-sectional area than that of embodiments dealing with larger contaminants providing that continuous ooze-like flow is obtained. The melt chamber 33 is of frusto-conical form and produces very quickly a controlled melt of molten plastics waste 122 which oozes out of the exit zone and into a moulding zone 126, 127, 128. In order to cope with large quantities of liquids in the event someone throws a full cup therein which liquid would not necessarily be vapourized by the densification chamber, the solidified plastics bodies 90b are collected in a liquid pervious tray 97a eg of mesh, so that any excess liquid can pass therethrough and into a drip tray 123. The used cups 121 are easily disposed of into the apparatus through an entry chute 124 which opens onto the front of the cabinet 1. Other forms densficiation chamber 33 suitable for cups are illustrated in FIGS. 25,26 and 27. In FIG. 25 the chamber 23 has a heated integral inwardly projecting annular shoulder 125 which serves to increase the dwell time somewhat of the molten plastics in the chamber 33.

The modification of FIGS. 26 and 27 shows an elongate frusto-conical chamber 33 which at its entry zone has a taper which matches larger plastics cups and matches smaller and smaller cups as the chamber tapers towards the outlet 39.

Figure 28:
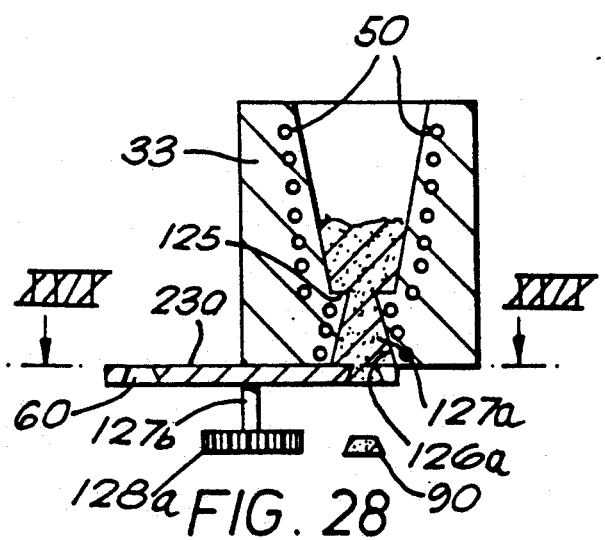
FIG. 28 is a vertical sectional view of a further modification which is also suitable for the treatment of used plastics cups.
Figure 29:
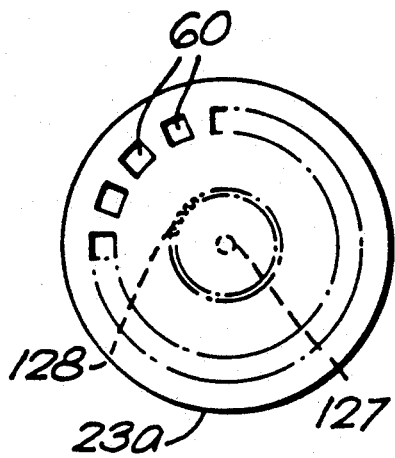
FIG. 29 is a plan view taken along the line XXIX—XXIX of FIG. 28 and looking in the direction of the arrows.

Referring now to FIGS. 28 and 29, this modification of densification chamber 33 also has an internal annular shoulder 125 in the region of its outlet and an extended exit zone 126a which diverges in the direction of flow to produce a divergent column 127a of contaminated molten plastics. The mould plate in this instance is constituted by a circular rotatable mould plate 23a having a multiplicity of mould cavities 60 therein of much smaller size than those of the sliding mould plate 23. The mould cavities 60 are cooled by suitable cooling circuitry like that of FIGS. 4 to 12 but because of their small size there is no need to have a cooperating mould base plate like 61. As the mould plate is indexed in rotation by a substantially vertical shaft 127b having a chain sprocket 128a by similar drive means to those used in the embodiment FIGS. 4 to 12, cooling of such a small body of molten plastics in each mould cavity 60 and therefore shrinkage occurs rapidly enough to ensure, with the aid of the downwardly diverging side walls of the cavities 60, that the solidified bodies are ejected before each mould cavity is indexed back to the filling position. Substantially horizontal movement of the plate 23a against the undersurface of the chamber 33 causes severing of the molten plastics charge in the mould cavity from the molten plastics column 127a.

Referring to FIG. 30, there is shown an apparatus for treating credit and cash cards. Such an apparatus is particularly suitable for use on site to destroy credit and cash cards damaged in manufacture. The cabinet 1 of the apparatus has a narrow entry slot 141 leading to a loading chute 7 and the apparatus thereafter with regard to producing solidified bodies could be, as illustrated in FIGS. 27,28 or as in FIG. 31 to be described. This apparatus can also be used to destroy expired credit cards.

Figure 31:
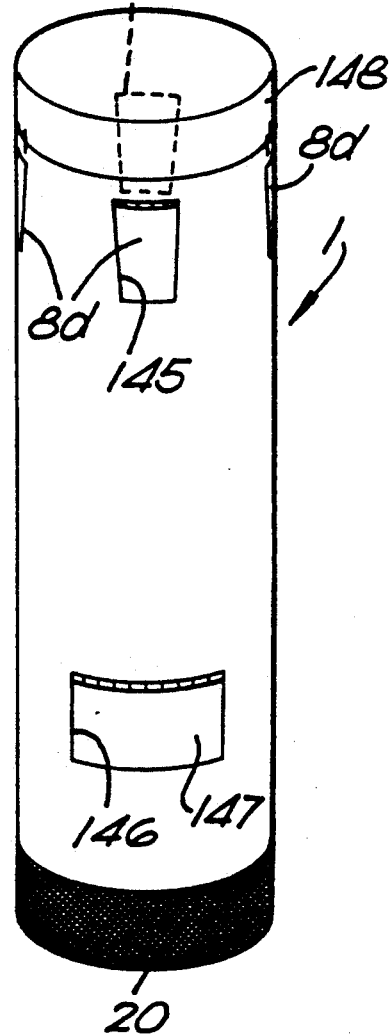
FIG. 31 is a perspective view of another embodiment for used dispensing machine cups.

Another way of treating used cups from vending machines is shown in FIG. 31, in which a stand-alone cabinet 1 of cylindrical configuration houses the melt chamber 33 such as that shown in FIG. 24 and other components such as shown in FIGS. 28 and 29. Such an embodiment could be of particular use in large areas which have installed vending machines and which are frequented by the public, such as airports, bus and railway stations.

The cabinet 1 has four upper openings 145 which are covered by respective swinging flap doors 8d and which are equispaced around the circular periphery of the cabinet. An opening 146 covered by a swinging flap 147 is provided for emptying any residual liquid left in the cups before disposal through the openings 145. The doors 8d are undirectional to allow cups to be readily pushed into the openings 145 and seal the openings 145 to prevent the escape of any fumes or odours. Air passes into the cabinet 1 through the inlet 20 and out through outlet 148.

Figure 32:
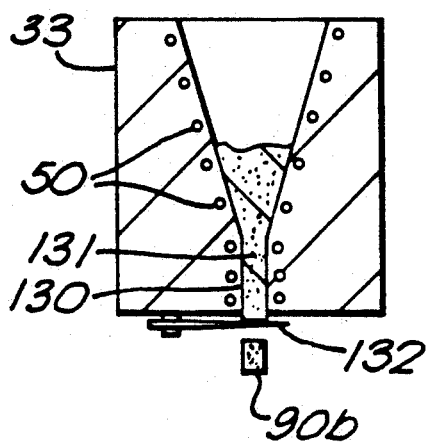
FIG. 32 is a sectional detail view of a still further modification.

In the modification of FIG. 32, moulding is not used to achieve solidification. Instead, as successive columnar portions of the molten plastics waste in the chamber 33 ooze through and project out of the exit zone which is elongated as indicated at 130, to provide a column 131, these protruding portions are cooled as by a coolant liquid spray. At this time severing means such as a knife 132 is moved horizontally under the control of the PLC by means of an electric motor, solenoid, piston and cylinder device or the like (not shown) connected to the electrical control circuit, to sever the solidified body 90b from the molten plastics column 131 in the exit zone 130. The chamber 33 has a much steeper frustoconical taper than any of the other embodiments.

The present invention may be embodied in other specific forms without departing from the spirit or essential attributes thereof and, accordingly, reference should be made to the appended claims, rather than to the foregoing specification as indicating the scope of the invention.

For example any combination of the modifications and variations described may be used. The molten plastics column emerging from the outlet may be fed to a slot die to achieve continuous casting for feeding direct into a hot melt granulator or for feeding onto a cooling conveyor feeding direct into a pelletising machine.

In addition to treating any of the plastics materials described previously in this specification, the invention also envisages the treatment of plastics waste comprising other plastics such as PET used interalia for carbonated drinks, and thermosetting resins. Problems are being experienced with the disposal of used car parts made from thermosetting resins which contain fillers and which cannot be recycled in the conventional sense and the work which has been done so far to solve these problems at least in the UK involves controlled incineration.

Furthermore, it is within the purview of this invention to provide means, such as a paddle or an open screw to increase throughput and to accentuate the melt against the heated wall of the melt chamber.

I claim:

1. A method of treating contaminated plastics waste, said method including the steps of:
   (a) providing a heating zone having an entry zone from which contaminated plastics waste can be fed into the heating zone and an exit zone beneath the entry zone,
   (b) bringing said heating zone to a temperature at which the plastics waste can be melted,
   (c) feeding contaminated plastics waste into the entry zone,
   (d) allowing the contaminated plastics waste to fall under gravity from the entry zone into the heated heating zone,
   (e) heating said contaminated plastics waste in said heated heating zone to a temperature at which the plastics waste is melted and forms molten flowable viscous plastics waste containing contaminant inclusions, and
   (f) causing the said molten flowable viscous plastics waste containing contaminant inclusions to flow from said heating zone to said exit zone, solely under the influence of gravity.

2. A method of treating contaminated plastics waste as claimed in claim 1, wherein the heating zone is of circular cross-section and wherein the heating is provided by heating means which extend around the said molten flowable viscous plastics waste containing contaminant inclusions, in the heating zone, to produce a controlled melt.

3. A method of treating contaminated plastics waste as claimed in claim 1, wherein the heating zone is an open volume.

4. A method of treating contaminated plastics waste as claimed in claim 1, wherein the heating zone has an inner surface which is coated with a polymeric material, such as polytetrafluoroethylene, to facilitate the gravity flow of the said molten flowable viscous plastics waste through the heating zone.

5. A method of treating contaminated plastics waste as claimed in claim 1, wherein the heating zone tapers towards the exit zone to facilitate the gravity flow of the said molten flowable plastics waste containing contaminant inclusions.

6. A method of treating contaminated plastics waste as claimed in claim 1, wherein the heating zone tapers all the way from the entry zone to the exit zone to facilitate the gravity flow of the said molten flowable viscous plastics waste containing contaminant inclusions.

7. A method of treating contaminated plastics waste as claimed in claim 1, wherein the heating zone has a cross-section that matches that of a waste plastics article to be treated.

8. A method of treating contaminated plastics waste as claimed in claim 1, wherein the melt has a periphery and a center and wherein the temperature of the melt is higher at the periphery than at the center of the melt, with there being a temperature gradation which is about 10° C. from the periphery to the center of the melt.

9. A method of treating contaminated plastics waste as claimed in claim 2, wherein the heating zone is defined by a wall in which the heating means are embedded.

10. A method of treating contaminated plastics waste as claimed in claim 9, wherein the heating means includes at least one electrical resistance heating element.

11. A method of treating contaminated plastics waste as claimed in claim 10, wherein the wall has an inner surface and an outer surface and wherein the said at least one electrical resistance heating element is embedded in the wall at a location that is nearer the inner surface than the outer surface of the wall.

12. A method of treating contaminated plastics waste as claimed in claim 10, wherein the said at least one electrical resistance heating element is a tubular sheathed element and includes a conductive metal outer tube and an inner axially extending spiral resistance wire with an insulating packing material in the form of a powder between the wire and the tube, and wherein the insulating powder is compressed by reducing the diameter of the tube after assembly.

13. A method of treating contaminated plastics waste as claimed in claim 10, wherein the at least one electrical resistance heating element is in the form of a loop having generally parallel extending elongate portions which extend around the melt.

14. A method of treating contaminated plastics waste as claimed in claim 9, wherein the said wall is formed by casting a high conductivity non-ferrous metal and wherein the said at least one electrical resistance heating element is embedded in the wall by integrally casting in the wall at the same time as casting the wall.

15. A method of treating contaminated plastics waste as claimed in claim 14, wherein the wall has an inner surface which is machined and coated with a polymeric material, such as polytetrafluoroethylene, to facilitate the gravity flow of the said molten flowable viscous plastics waste containing contaminant inclusions through the heating zone.

16. A method of treating contaminated plastics waste as claimed in claim 1, and further comprising causing the molten flowable viscous plastics waste containing contaminant inclusions to form a reservoir such as to provide a dwell time which is sufficient to sterilize the contaminant inclusions in the reservoir.

17. A method of treating contaminated plastics waste as claimed in claim 1, and further comprising providing the heating zone with temperature zones which are disposed one above the other and which vary in temperature from the entry zone to the exit zone to produce a controlled melt and such that the exit zone is heated.

18. A method of treating contaminated plastics waste as claimed in claim 1, wherein the exit zone only is heated.

19. A method of treating contaminated plastics waste as claimed in claim 1, wherein the said molten flowable viscous plastics waste containing contaminant inclusions has a middle and wherein heat is introduced into the middle of the said molten flowable viscous plastics waste in the exit zone by means of a projection which projects upwardly and into the middle of the molten flowable viscous plastics waste in the exit zone and which has a free upper end surrounded by the said molten flowable viscous plastics waste in the exit zone.

20. A method of treating contaminated plastics waste as claimed in claim 19, wherein the projection is in the form at least one web which splits the exit zone into a plurality of smaller discharge outlets through which the said molten flowable viscous plastics waste containing contaminant inclusions flows.

21. A method of treating contaminated plastics waste as claimed in claim 1, wherein at least some of the plastics waste has a high volume to weight ratio and is densified in heating and melting to form molten flowable viscous plastics waste containing contaminant inclusions.

22. A method of treating contaminated plastics waste as claimed in claim 1, wherein the exit zone extends downstream of the heating zone.

23. A method of treating contaminated plastics waste as claimed in claim 1, wherein the said molten flowable viscous plastics waste containing contaminant inclusions flows out of said exit zone in the form of a column, solely under the influence of gravity.

24. A method of treating contaminated plastics waste as claimed in claim 23, wherein the column enters a cooling zone downstream of the exit zone after the column has emerged from the exit zone and the emerging molten, flowable viscous plastics waste containing contaminant inclusions is severed from the column to produce solidified bodies of previously molten flowable viscous plastics waste which encapsulate, carry or support the contaminant inclusions.

25. A method of treating contaminated plastics waste as claimed in claim 1, and further comprising causing the said molten flowable contaminated plastics waste containing contaminant inclusions to flow, solely under the influence of gravity, from the exit zone and into a cooling zone in which the molten flowable viscous plastics waste containing contaminant inclusions is solidified.

26. A method of treating contaminated plastics waste as claimed in claim 25, wherein solidified bodies which are of previously molten flowable viscous plastics waste and which encapsulate, carry or support the said contaminant inclusions are produced in said cooling zone.

27. A method of treating contaminated plastics waste as claimed in claim 26, wherein the solidified bodies are sterile, shaped and stackable.

28. A method of treating contaminated plastics waste as claimed in claim 26, wherein the contaminant inclusions are a health hazard and are encapsulated in the solidified bodies.

29. A method as claimed in claim 26, wherein the cooling zone includes at least one mold cavity in which solidifying takes place and which is filled with the said molten flowable viscous plastics waste containing contaminant inclusions emerging from the exit zone and wherein air is vented from the said at least one mold cavity during filling of the mold cavity.

30. A method as claimed in claim 29, wherein the solidified bodies are ejected from the at least one mold cavity under gravity.

31. A method of treating contaminated plastics waste as claimed in claim 29 and further comprising a plurality of mold cavities which are successively filled with molten flowable viscous plastics waste containing contaminant inclusions.

32. A method of treating contaminated plastics waste as claimed in claim 29, wherein the at least one mold cavity is an inwardly tapering mold cavity to permit a solidified body to be ejected therefrom under gravity.

33. A method of treating contaminated plastics waste as claimed in claim 29, wherein at least one mold cavity is cooled by means of a coolant fluid passing through a coolant duct.

34. A method of treating contaminated plastics waste as claimed in claim 33, wherein the at least one mold cavity is defined by a support member in which the coolant duct is embedded.

35. A method of treating contaminated plastics waste as claimed in claim 33, wherein the at least one coolant duct is in the form of a loop.

36. A method of treating contaminated plastics waste as claimed in claim 34, wherein the support member is cast of metal and wherein the at least one coolant duct is embedded in the metal during casting of the support member, whereby the at least one cooling duct is integrally cast-in.

37. A method of treating contaminated plastics waste as claimed in claim 29, wherein the exit zone is split into two smaller discharge outlets by a heated web which projects upwardly into the molten flowable viscous plastics waste and has an upper free end which is surrounded by the said molten flowable viscous plastics waste containing contaminant inclusions.

38. A method of treating contaminated plastics waste as claimed in claim 37, wherein the projection is of high conductivity non-ferrous cast metal and has an integrally cast-in electrical resistance heating element.

39. A method of treating contaminated plastics waste as claimed in claim 38, wherein the electrical resistance heating element in the web is in the form of a loop having generally parallel elongate portions which extend transversely of the exit zone.

40. A method of treating contaminated plastics waste as claimed in claim 38, wherein a horizontally slideable support member defines two said mold cavities which are alternatively positioned beneath the two discharge outlets to permit one cavity to receive the said molten flowable viscous plastics waste containing contaminant inclusions and to permit a solidified body of previously molten flowable viscous plastics waste to be ejected therefrom under gravity.

41. A method of treating contaminated plastics waste as claimed in claim 40, wherein the two said mold cavities are defined by respective mold parts of said support member, separated by an obturator part of said support member, wherein said mold parts and said obturator part are of metal and are separated by respective thermal breaks between the mold parts and the obturator part and wherein the support member is moveable into three positions, namely one position in which one discharge outlet is open to allow filling of one mold cavity with the said molten flowable viscous plastics waste emerging from the exit zone, the other discharge outlet is closed by the obturator part and the other mold cavity ejects a solidified body formed therein, another position in which the filled mold cavity is being cooled and flow through both discharge outlets is obturated by the obturator part, and a further position in which the cooled mold cavity ejects a solidified body formed therein and the other discharge outlet is open to allow filling of the other mold cavity with molten flowable viscous plastics waste emerging from the exit zone, with the movement of each mold cavity from a mold filling position to a mold cooling position causing the obturator part to sever the molten plastics waste in the mold from the molten plastics waste in the exit zone.

42. A method of treating contaminated plastics waste as claimed in claim 41, and including heating the filling mold cavity from beneath to assist the flow of molten flowable viscous plastics waste containing contaminant inclusions into the mold cavity and cooling the filled mold cavity from beneath to facilitate solidification therein of the molten flowable viscous plastics waste containing contaminant inclusions.

43. A method of treating contaminated plastics waste as claimed in claim 29, wherein the at least one mold cavity is provided with a coating of a polymeric material such as polytetrafluoroethylene.

44. A method of treating contaminated plastics waste as claimed in claim 40, wherein the sliding surfaces of the support member are provided with a coating of a polymeric material, such as polytetrafluoroethylene.

45. A method of treating contaminated plastics waste as claimed in claim 10, and further including providing the heating zone with temperature zones which are disposed one above the other and which vary in temperature from the entry zone to the exit zone and wherein each temperature zone includes a plurality of generally parallel extending elongate portions of said electrical resistance heating element, which elongate portions are located closer together in the exit zone than in the remainder of the heating zone to increase the heating of the molten flowable viscous plastics waste containing contaminant inclusions in the exit zone.

46. A method of treating contaminated plastics waste as claimed in claim 29 and further comprising a plurality of said mold cavities which are inwardly tapered and wherein said cavities successively receive the said molten flowable viscous plastics waste containing contaminant inclusions emerging from the exit zone, cool the molten plastics waste received therein to produce solidified bodies of previously molten flowable viscous plastics waste containing contaminants inclusions, and eject said solidified bodies under gravity.

47. A method of treating contaminated plastics waste as claimed in claim 46, wherein the mold cavities are defined by a circular mold plate which is rotated about a substantially vertical axis.

48. A method of treating contaminated plastics waste as claimed in claim 46, wherein the mold cavities are defined by a circular cross-section carrier member that is rotatable about a generally horizontal axis.

49. A method of treating contaminated plastics waste, said method including the steps of:
a) providing a heating zone having an entry zone from which contaminated plastics waste can be fed into the heating zone and an exit zone beneath the entry zone,
b) bringing said heating zone to a temperature at which the plastics waste can be melted,
c) feeding contaminated plastics waste into the entry zone,
d) allowing the contaminated plastics waste to fall under gravity the entry zone into the heated heating zone,
e) heating said contaminated plastics waste in said heated heating zone to a temperature at which the plastics waste is melted and forms molten flowable viscous plastics waste containing contaminant inclusions,
f) causing the said molten flowable viscous plastics waste containing contaminant inclusions to flow out of said heating zone through said exit zone, solely under the influence of gravity, and
g) said exit zone having a cross-sectional area of such dimensions that the said molten flowable viscous plastics waste containing contaminant inclusions flows out of said exit zone uninterrupted by the presence of the contaminant inclusions, solely under the influence of gravity.

50. A method of encapsulating a contaminant which is a health hazard, said method including the steps of:
a) providing a heating zone having an entry zone from which a contaminant that is a health hazard and plastics can be fed into the heating zone and an exit zone beneath the entry zone,
b) brining said heating zone to a temperature at which the plastics can be melted,
c) feeding the health hazard contaminant and the plastics into the entry zone,
d) allowing the health hazard contaminant and plastics to fall under gravity from the entry zone into the heated heating zone,
e) heating the health hazard contaminant and the plastics in said heated heating zone to a temperature at which the plastics is melted and forms molten flowable viscous plastics containing health hazard contaminant inclusions,
f) causing the said molten flowable viscous plastics containing the health hazard contaminant inclusions to flow out of said heating zone to said exit zone, solely under the influence of gravity, and
g) causing the said molten flowable viscous plastics containing the health hazard contaminant inclusions to flow, solely under the influence of gravity, from the exit zone into a cooling zone in which the molten flowable viscous plastics waste containing the health hazard contaminant inclusions is solidifed to produce solidified bodies which are of previously molten flowable viscous plastics and which encapsulate the said health hazard contaminant inclusions.

51. A method treating contaminated plastics waste as claimed in claim 50, and further comprising causing the molten flowable viscous plastics containing the health hazard contaminant inclusion to form a reservoir such as to provide a dwell time which is sufficient to sterilize the health hazard contaminant inclusions in the reservoir.

52. A method of treating contaminated plastics waste as claimed in claim 26 and further comprising the steps of recycling the solidified bodies to energy.

53. A method of treating contaminated plastics waste as claimed in claim 9, wherein the wall defining the heating zone has a thickness of 12 mm to 40 mm.

54. A method of treating contaminated plastics waste as claimed in claim 29, wherein at least one mold cavity is movable out of alignment with the exit zone, which severs the molten flowable viscous plastics waste containing contaminant inclusions from that emerging from the exit zone and into a location in which the mold cavity is thermally isolated from the exit zone, and in which a coolant exerts an effect that causes solidification, after which a solidified body of previously molten flowable viscous plastics waste containing contaminant inclusions is ejected from the mold cavity.

55. A method of treating contaminated plastics waste as claimed in claim 54, wherein another mold cavity is brought into alignment with the exit zone during ejection of a solidified body from the first mentioned mold cavity.

56. A method of treating contaminated plastics waste as claimed in claim 29, wherein the at least one mold cavity has a shape which assists ejection of a solidified body from the mold cavity under gravity.

* * * * *